(12) United States Patent
Ohnishi et al.

(10) Patent No.: US 8,953,543 B2
(45) Date of Patent: Feb. 10, 2015

(54) COMMUNICATION TERMINAL, CONTROL DEVICE, COMMUNICATION METHOD, CONTROL METHOD, PROGRAM, AND INTEGRATED CIRCUIT

(75) Inventors: Toshiaki Ohnishi, Hyogo (JP);
Kazuhiro Ando, Kanagawa (JP);
Hironori Nakae, Osaka (JP)

(73) Assignee: Panasonic Corporation, Osaka (JP)

( * ) Notice: Subject to any disclaimer, the term of this patent is extended or adjusted under 35 U.S.C. 154(b) by 114 days.

(21) Appl. No.: 13/642,581

(22) PCT Filed: Jun. 8, 2011

(86) PCT No.: PCT/JP2011/003226
§ 371 (c)(1),
(2), (4) Date: Oct. 22, 2012

(87) PCT Pub. No.: WO2011/155191
PCT Pub. Date: Dec. 15, 2011

(65) Prior Publication Data
US 2013/0039323 A1    Feb. 14, 2013

(30) Foreign Application Priority Data

Jun. 9, 2010  (JP) .................................. 2010-132408

(51) Int. Cl.
*H04W 4/00* (2009.01)
*H04W 74/08* (2009.01)

(52) U.S. Cl.
CPC ................................. *H04W 74/0808* (2013.01)
USPC ........................................ 370/329; 370/341

(58) Field of Classification Search
USPC ......................................... 370/310–350, 252
See application file for complete search history.

(56) References Cited

U.S. PATENT DOCUMENTS

2007/0248044 A1* 10/2007 Vogety et al. .................. 370/329
2011/0222486 A1*  9/2011 Hart .............................. 370/329
2011/0299408 A1* 12/2011 Gunawardena et al. ...... 370/252

FOREIGN PATENT DOCUMENTS

| JP | 2002-359864 | 12/2002 |
| JP | 2007-158765 | 6/2007 |
| JP | 2007-274145 | 10/2007 |
| JP | 2008-042922 | 2/2008 |

OTHER PUBLICATIONS

International Search Report issued Sep. 6, 2011 in International (PCT) Application No. PCT/JP2011/003226.
M. Morikura et al., "Kaiteiban 802.11 Kosoku Musen LAN Kyokasho", the Impress Japan, Jan. 1, 2005, pp. 89-91, with partial English translation.

* cited by examiner

*Primary Examiner* — Warner Wong
(74) *Attorney, Agent, or Firm* — Wenderoth, Lind & Ponack, L.L.P.

(57) ABSTRACT

The communication terminal includes a receiving unit and a transmission unit, which serve as a communication unit for signal exchange; and a beacon processing unit as a first detection unit that detects, for each channel, the number of the other communication terminals performing wireless communication by receiving a terminal number notification signal from a control device. Additionally, a data processing unit is provided as a second detection unit that counts, for each channel, the number of the other communication terminals found by receiving acknowledgement signals transmitted from the other communication terminals; and a channel control unit selects a frequency channel having a least difference between the number detected by the beacon processing unit and the number counted by the data processing unit, and causes the receiving unit and the transmission unit to perform the signal exchange via the selected frequency channel.

15 Claims, 36 Drawing Sheets

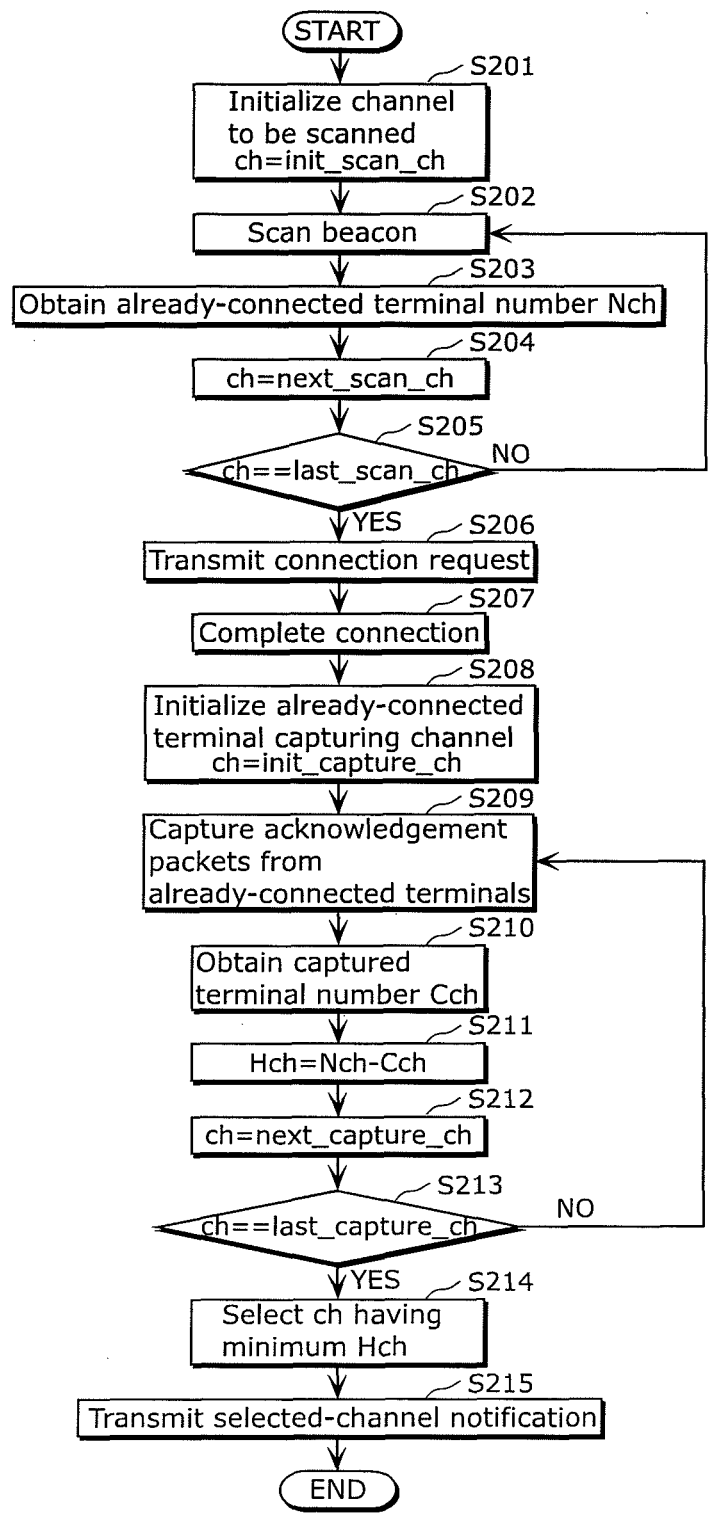

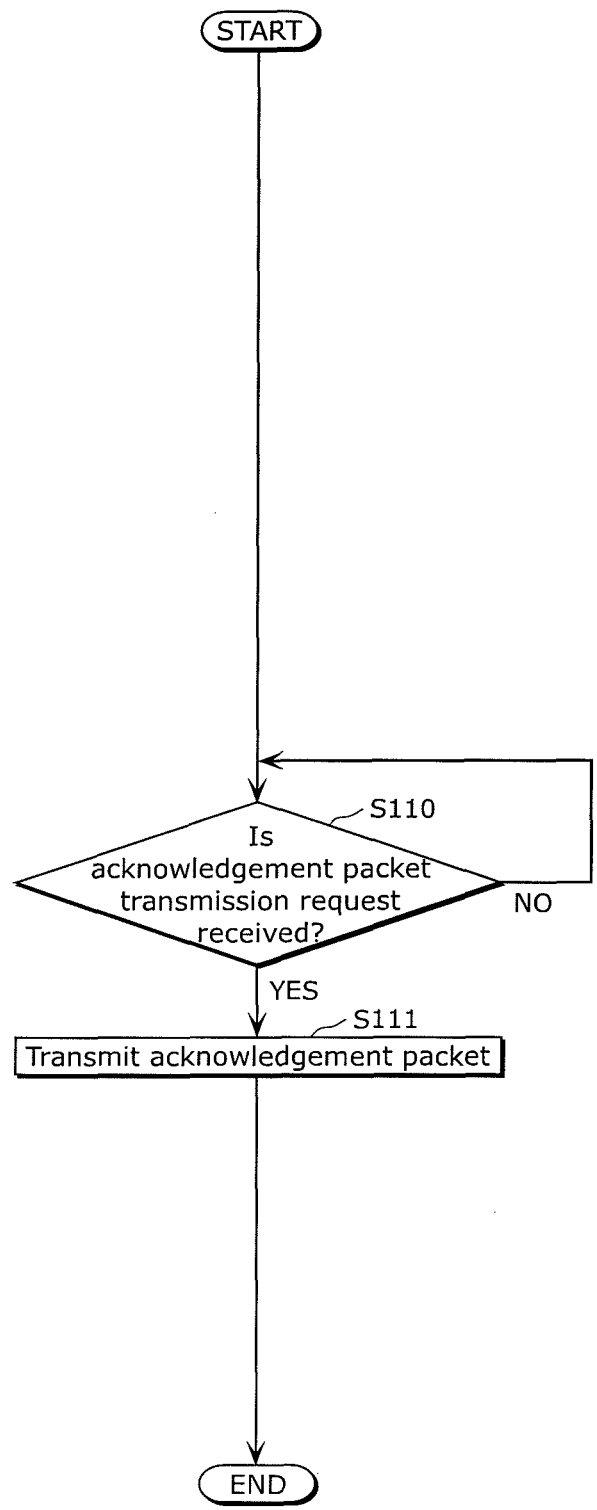

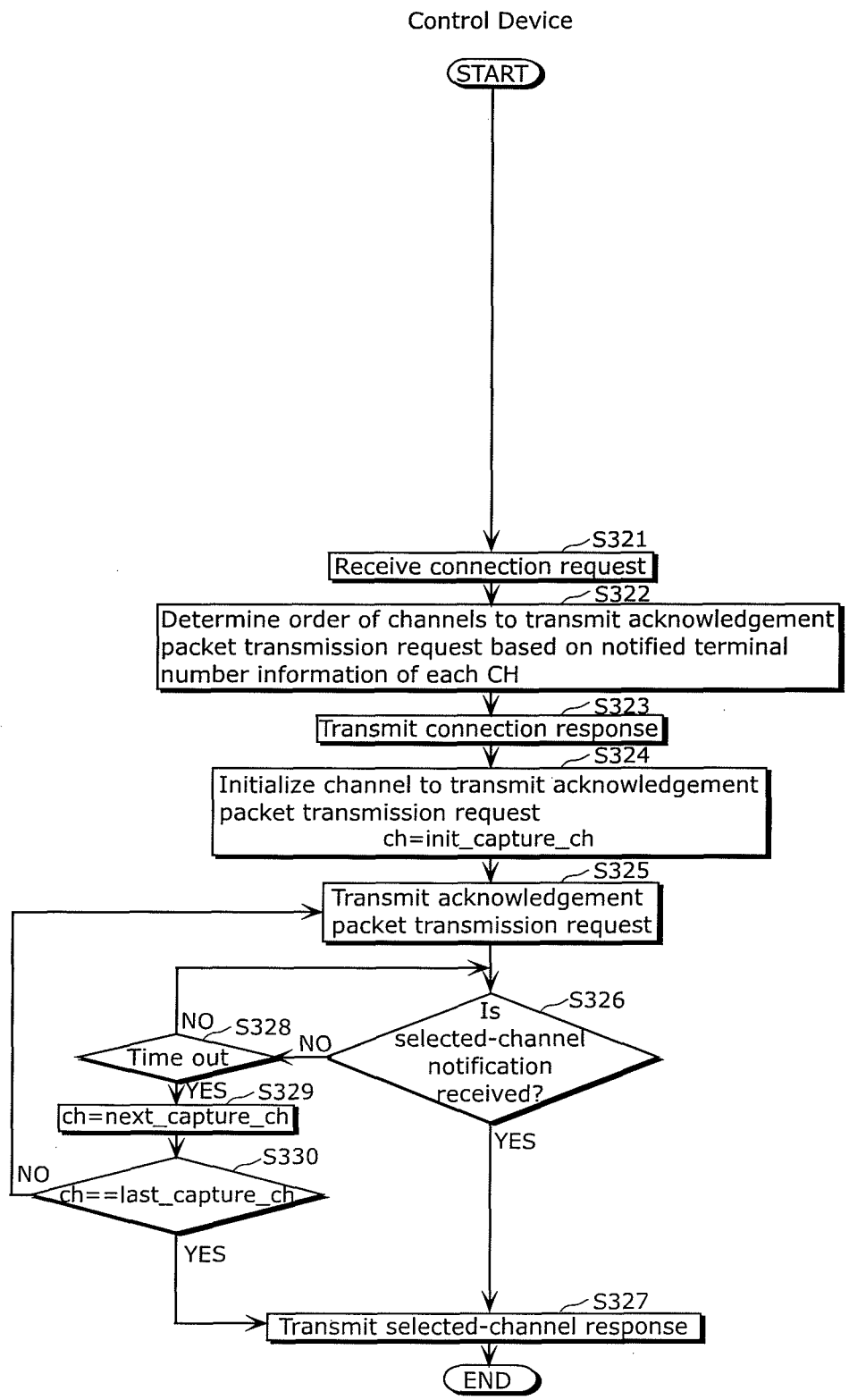

Already-Connected Terminal

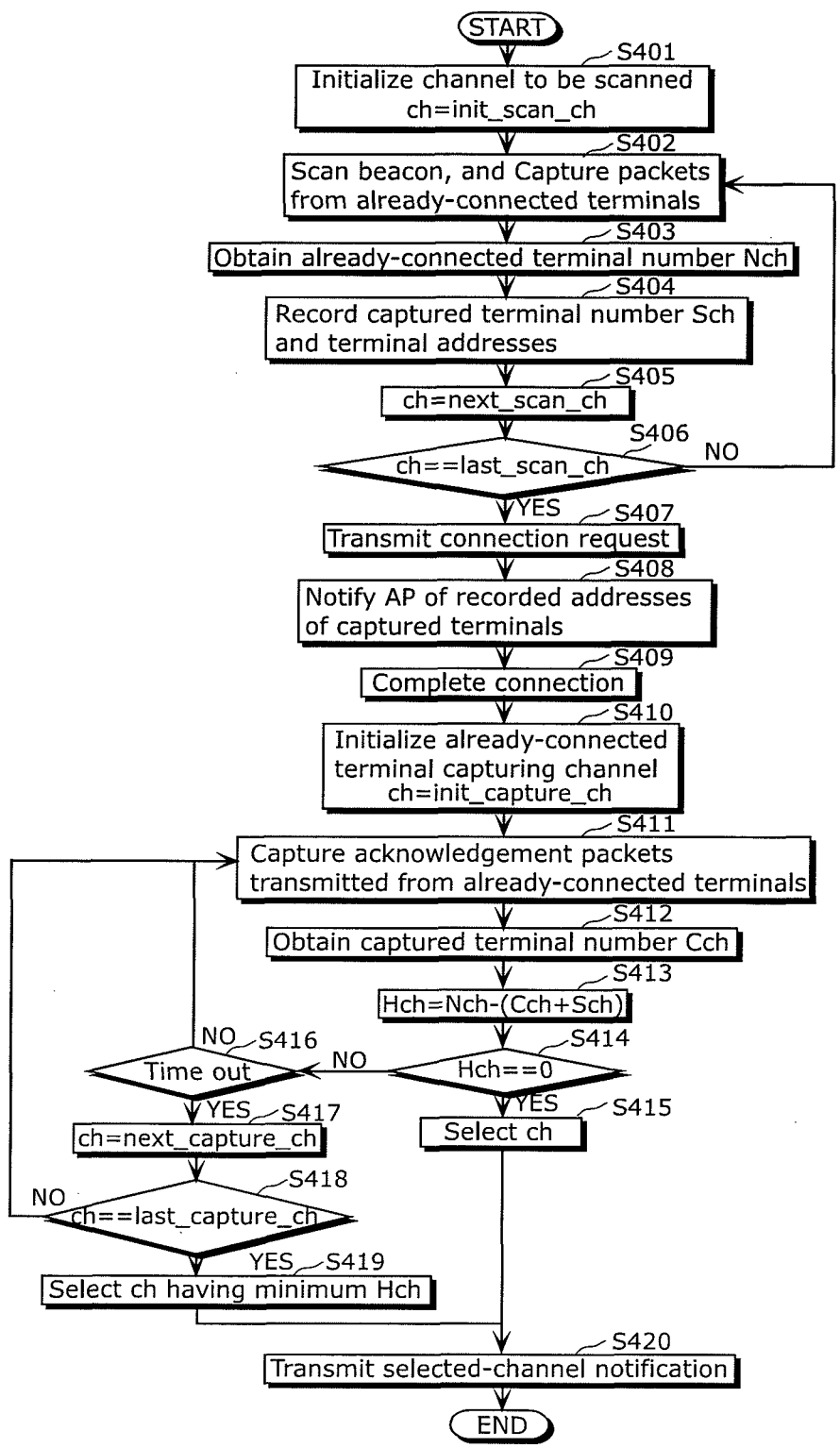

Already-Connected Terminal

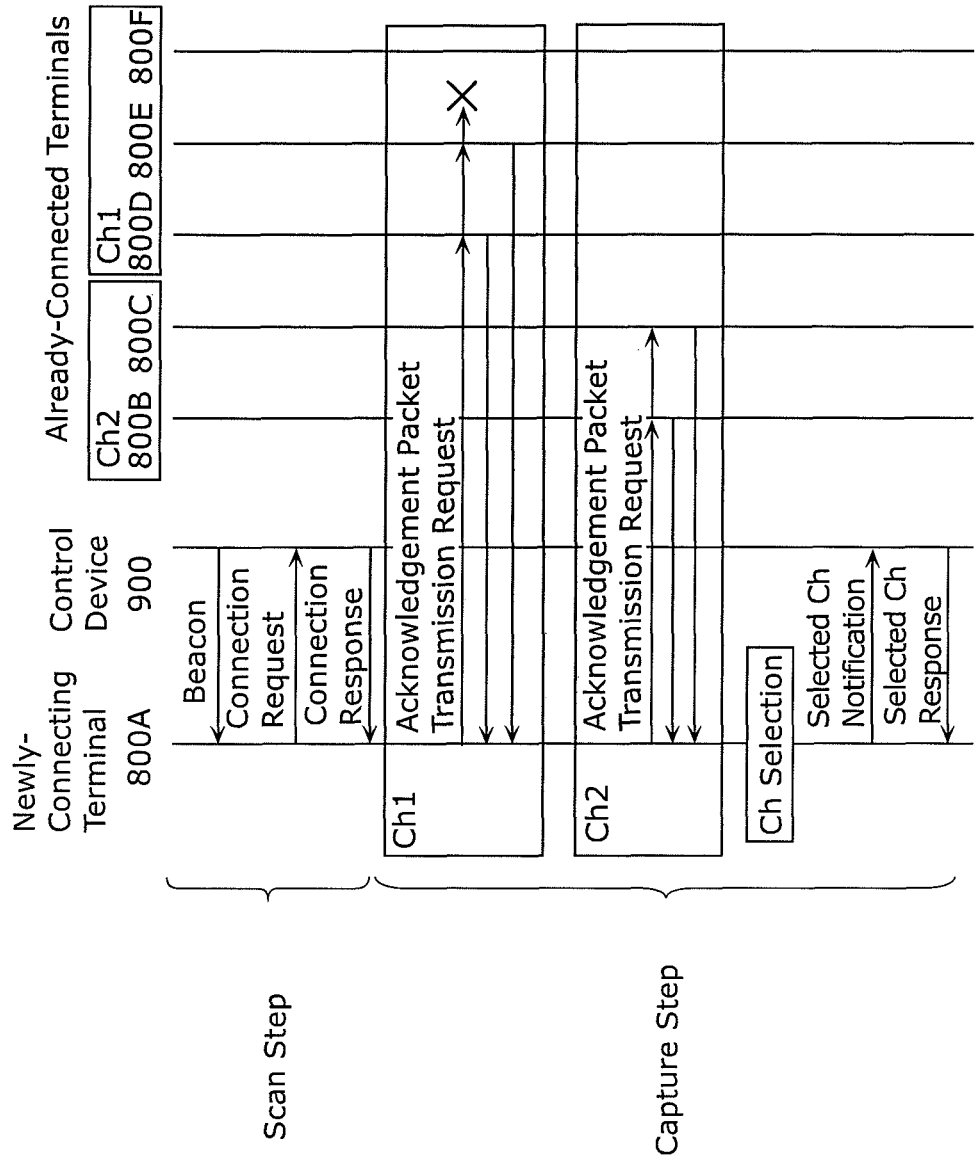

COMMUNICATION TERMINAL, CONTROL DEVICE, COMMUNICATION METHOD, CONTROL METHOD, PROGRAM, AND INTEGRATED CIRCUIT

BACKGROUND OF INVENTION

1. Technical Field

The present invention relates to methods of avoiding packet collision caused by hidden terminal problems in wireless communication systems.

2. Background Art

Conventionally, the Carrier Sence Multiple Access with Collision Avoidance (CSMA/CA) method has been known as one of random access control techniques used in digital wireless communication systems. This method is adopted in IEEE802.11 standardized for wireless Local Area Network (LAN).

However, in CSMA/CA, there is a situation where two terminals in a communication area provided by a control device (referred to also as a "control point") cannot receive radio signals from each other due to the distance between the terminals, influence of an obstacle such as a wall, or the like. Such a problem caused by signal exchange failure is called a "hidden terminal problem".

FIG. 28 is a conceptual diagram for explaining the "hidden terminal problem". In FIG. 28, each of a transmitting terminal 30A and a transmitting terminal 30B communicates with a receiving terminal 40. However, there is a possibility that the transmitting terminals 30A and 30B fail to detect signals transmitted from each other by their carrier sences, and therefore transmit signals to the receiving terminal 40 at the same time, thereby causing collision between the signals.

One of the techniques of solving this hidden terminal problem has been disclosed in, for example, Non-Patent Literature 1. As shown in FIG. 29, the transmitting terminals 30A and 30B and the receiving terminal 40 exchange a control signal called a Request to Send/Clear to Send (RTS/CTS). It is thereby possible to reduce a possibility of collision between data signals transmitted from the transmitting terminals 30A and 30B.

Prior to data transmission, the transmitting terminal 30A transmits a RTS signal to the receiving terminal 40. In receiving the RTS signal, the receiving terminal 40 transmits a CTS signal to the transmitting terminals 30A and 30B. The transmitting terminal 30B receives the CTS signal and waits for transmission, stopping signal transmission. On the other hand, the transmitting terminal 30A receiving the CTS signal starts its data transmission. The RTS/CTS signal exchange between the transmitting terminal 30A and the receiving terminal 40 causes the transmitting terminal 30B to wait for transmission. It is therefore possible to reduce a probability of collision between signals transmitted from the transmitting terminals 30A and 30B.

In addition, as shown in FIG. 30, another technique for preventing the hidden terminal problem without using RTS/CTS is disclosed in Patent Literature 1. In this technique, if a terminal is connectable to a plurality of control devices in a communication system, the terminal selects a control device having a low probability of hidden terminal problem to be connected.

In FIG. 30, the terminal scans a frequency channel of a control device 1 to measure traffic statistic on a network, thereby obtaining a channel occupancy. Next, the terminal performs the same scanning for a frequency channel of a control device 2.

On the other hand, each of the control devices 1 and 2 scans a using frequency channel to obtain traffic statistics on the network. Then, based on the traffic statistics, a channel use rate of the terminal is calculated to be provided to the terminal.

The terminal thereby selects a control device to be connected, according to the channel occupancy and the channel use rates which are obtained in the above-described manner.

In other words, by the technique disclosed in Patent Literature 1, under the observation that signals transmitted from all of terminals in a communication area arrive at a control device, a target terminal is connected to a control device determined as having least hidden terminal problem in consideration of a difference between a traffic amount scanned by each of the control devices and a traffic amount scanned by the terminal.

CITATION LIST

Patent Literature

[PTL 1] Japanese Unexamined Patent Application Publication No. 2008-42922

Non Patent Literature

[NPL 1] "Kaiteiban 802.11 Kosoku Musen LAN Kyokasho" edited by Masahiro Morikura, Impress, Jan. 1, 2005 (pp. 89 to 91)

SUMMARY OF INVENTION

However, according to the technique disclosed in Non-Patent Literature 1, RTS/CTS signals become overhead of data communication. As a result, a throughput is decreased. In particular, if a data size is small, influence of the overhead is considerable.

In the technique disclosed in Non-Patent Literature 1, in the random access control system, some terminal would not communicate while a certain terminal is scanning a frequency channel.

Therefore, such a terminal, which is not a hidden terminal, is misidentified as a hidden terminal. As a result, an accuracy of detecting hidden terminals is decreased. In particular, in wireless communication systems for power saving, such as ZigBee, a time required for communication in terminals is controlled to be short. Therefore, a large number of terminals do not communicate during the above-described frequency channel scanning.

Furthermore, it takes a long time to scan to obtain effective traffic statistics in a wireless communication system. Moreover, as the number of channels to be scanned is increased, the scanning time is increased.

In order to solve the above-described conventional problems, an object of the present invention is to provide a communication terminal, a control device, a communication method, and a control method each of which is capable of reducing influence caused in detecting hidden terminals even if the number of frequency channels is increased.

In accordance with an aspect of the present invention for achieving the object, there is provided a communication terminal comprising: a communication unit configured to exchange signals via a frequency channel selected from a plurality of frequency channels; a first detection unit configured to detect, for each of the frequency channels, a number of one or more other communication terminals performing wireless communication via the each of the frequency channels, by causing the communication unit to receive a notification signal indicating the number from a control device while the frequency channels are sequentially switched; a second detection unit configured to count, for the each of the frequency channels, a number of one or more other communication terminals performing wireless communication via the each of the frequency channels, by causing the communication unit to receive acknowledgement signals transmitted from the one or more other communication terminals while the frequency channels are sequentially switched; and a channel control unit configured to (i) select, from the frequency channels, a frequency channel having a least difference between the number detected by the first detection unit and the number counted by the second detection unit, and (ii) cause the communication unit to exchange the signals with the control device via the selected frequency channel.

It should be noted that the present invention can be implemented not only as the above-described device, but also as: an integrated circuit including the processing units included in the device; a control method including steps performed by the processing units included in the device: or a program causing a computer to execute these steps.

According to the present invention, a terminal to be newly connected to a control device can reduce a probability of hidden terminal problem. In addition, even if the number of frequency channels is increased, the influence caused in detecting hidden terminals can be reduced.

BRIEF DESCRIPTION OF DRAWINGS

FIG. 7A is a flowchart of processing performed by a newly-connecting terminal according to Embodiment 2 of the present invention.

FIG. 7C is a flowchart of processing performed by an already-connected terminal according to Embodiment 2 of the present invention.

FIG. 13B is a flowchart of processing performed by a control device according to Embodiment 3 of the present invention.

FIG. 18A is a flowchart of processing performed by a newly-connecting terminal according to Embodiment 4 of the present invention.

FIG. 24 is a diagram showing an example of a connection sequence according to Embodiment 5 of the present invention.

DETAILED DESCRIPTION OF INVENTION

Figure 1:
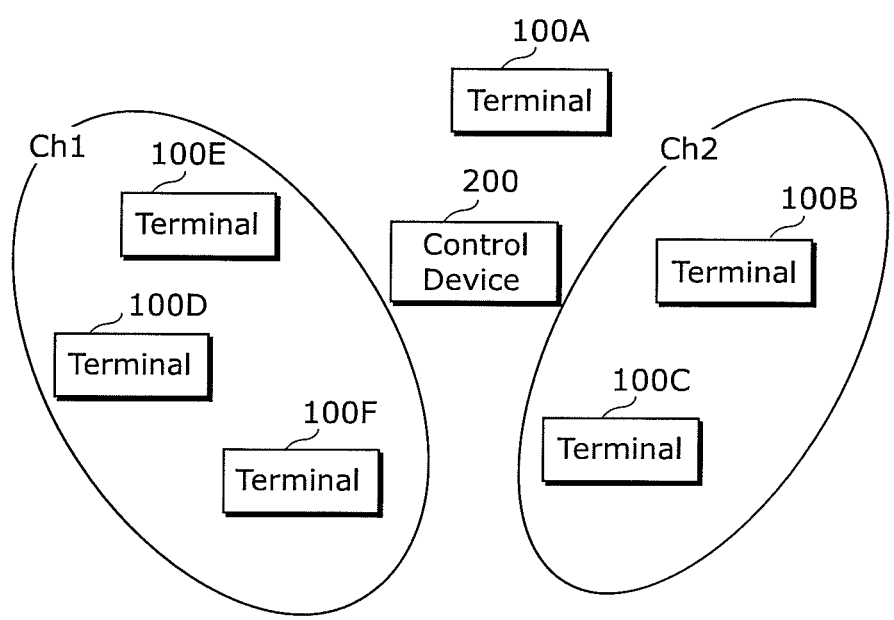
FIG. 1 is a configuration example of a wireless communication system according to Embodiment 1 of the present invention.

In accordance with an aspect of the present invention, there is provided a communication terminal comprising: a communication unit configured to exchange signals via a frequency channel selected from a plurality of frequency channels; a first detection unit configured to detect, for each of the frequency channels, a number of one or more other communication terminals performing wireless communication via the each of the frequency channels, by causing the communication unit to receive a notification signal indicating the number from a control device while the frequency channels are sequentially switched; a second detection unit configured to count, for the each of the frequency channels, a number of one or more other communication terminals performing wireless communication via the each of the frequency channels, by causing the communication unit to receive acknowledgement signals transmitted from the one or more other communication terminals while the frequency channels are sequentially switched; and a channel control unit configured to (i) select, from the frequency channels, a frequency channel having a least difference between the number detected by the first detection unit and the number counted by the second detection unit, and (ii) cause the communication unit to exchange the signals with the control device via the selected frequency channel.

With the above structure, by using the notification signal and the acknowledgement signals, it is possible to detect, for each of the frequency channels, the number of communication terminals existing in a range where wireless signals (radio waves) arrive at the terminals. As a result, it is possible to perform wireless communication by selecting a frequency channel having a least number of hidden terminals. It should be noted that the "acknowledgement signals" received by the above-described communication terminal may propagate from the other communication terminals directly to the communication terminal without being relayed by the control device or the like.

It is possible that the channel control unit is configured to (i) select, from the frequency channels, a frequency channel having the number detected by the first detection unit which is equal to the number counted by the second detection unit, and (ii) causes the communication unit to exchange the signals with the control device via the selected frequency channel.

It is also possible that the channel control unit is configured, after the first detection unit detects the number for each of the frequency channels, to cause the communication unit to transmit an order signal to the control device, the order signal being for ordering the control device to transmit a request signal for requesting the one or more other communication terminals to transmit the acknowledgement signals.

It is further possible that the communication terminal further includes a third detection unit configured to detect, for each of the frequency channels, a number of the one or more other communication terminals which are one or more source terminals transmitting signals, by causing the communication unit to receive the signals while the first detection unit detects the number for each of the frequency channels, wherein the channel control unit is configured to cause the communication unit to transmit the order signal to the control device, the order signal being for ordering the control device to transmit the request signal via the respective frequency channels in order of decreasing a difference between the number included in the notification signal and the number of the one or more source terminals.

With the above structure, it is possible to detect existence of a hidden terminal in order of frequency channels having a lower possibility of having a hidden terminal. Then, it is possible to stop the processing at the time of finding a frequency channel without a hidden terminal. As a result, a processing load can be reduced.

It is further possible that the communication terminal further includes a third detection unit configured to detect, for the each of the frequency channels, information for identifying the one or more other communication terminals which are one or more source terminals transmitting signals, by causing the communication unit to receive the signals while the first detection unit detects the number for each of the frequency channels, wherein the channel control unit is configured to cause the communication unit to transmit the order signal to the control device, the order signal being for ordering the control device to transmit the request signal to only a communication terminal not detected by the third detection unit.

With the above structure, since the request signal is not transmitted to a communication terminal which has been found. As a result, it is possible to reduce a traffic caused in detecting a hidden terminal.

It is further possible that the communication terminal further includes a signal generation unit configured, while the frequency channels are sequentially switched, to (i) generate a request signal for requesting the one or more other communication terminals to transmit the acknowledgement signals, and (ii) cause the communication unit to transmit the request signal.

With the above structure, it is not necessary to add, to the control device, the function of transmitting the request signal. It should be noted that the "request signal" received by the above-described other communication terminals may propagate from the communication terminal (source terminal) transmitting the signal directly to the other communication terminals without being relayed by the control device or the like.

In accordance with another aspect of the present invention, there is provided a control device that wirelessly communicates with a communication terminal, the control device comprising: a communication unit configured to exchange signals via a frequency channel selected from a plurality of frequency channels; a management unit configured to hold, for each of the frequency channels, information of one or more communication terminals performing wireless communication via the each of the frequency channels; a first signal generation unit configured, while the frequency channels are sequentially switched, to (i) generate a notification signal including a number of the one or more communication terminals performing wireless communication via the each of the frequency channels, and (ii) cause the communication unit to transmit the notification signal to a new communication terminal to newly start communication; and a second signal generation unit configured, while the frequency channels are sequentially switched, to (i) generate a request signal for requesting the one or more communication terminals to transmit acknowledgement signals to the new communication terminal, and (ii) cause the communication unit to transmit the request signal to the one or more communication terminals.

With the above structure, it is possible to notify the new terminal of the number of terminals for each of the frequency channels, and also to cause the communication terminals which are communicating to surely transmit the acknowledgement signals. As a result, the new communication terminal can select a frequency channel with a least number of hidden terminals.

It is possible that the control device further includes a channel control unit configured to cause the second signal generation unit to generate the request signal for each of the frequency channels based on an order signal, the order signal being for ordering the new communication terminal to transmit the request signal to the one or more communication terminals.

It is also possible that the channel control unit is configured to (i) cause the communication unit to receive, for each of the frequency channels, the order signal including the number of the one or more communication terminals found by the new communication terminal, and (ii) cause the second signal generation unit to generate the request signal sequentially for the frequency channels in order of decreasing a difference between the number held in the management units and the number included in the order signal.

It is further possible that the channel control unit is configured to (i) cause the communication unit to receive the order signal including information for identifying the one or more communication terminals found by the new communication terminal, and (ii) cause the second signal generation unit to generate the request signal to be transmitted to only a communication terminal not found by the new communication terminal.

It is further possible that the control device (i) gathers, for each predetermined time period, statistics on a traffic amount of each of the one or more communication terminals managed by the management unit, and (ii) causes the control unit to select, from the frequency channels, a frequency channel having a least traffic amount of a communication terminal from which the new communication terminal fails to receive an acknowledgement signal.

In accordance with still another aspect of the present invention, there is provided a communication method of wirelessly communicating via a plurality of frequency channels, the communication method comprising: detecting, for each of the frequency channels, a number of one or more other communication terminals performing wireless communication via the each of the frequency channels, by receiving a notification signal indicating the number from a control device while the frequency channels are sequentially switched; counting, for the each of the frequency channels, a number of one or more other communication terminals performing wireless communication via the each of the frequency channels, by receiving acknowledgement signals transmitted from the one or more other communication terminals while the frequency channels are sequentially switched; and (i) selecting, from the frequency channels, a frequency channel having a least difference between the number detected in the detecting and the number counted in the counting, and (ii) exchanging the signals with the control device via the selected frequency channel.

In accordance with still another aspect of the present invention, there is provided a control method of controlling a control device that wirelessly communicates with a communication terminal, the control method comprising: holding, for each of a plurality of the frequency channels, information of one or more communication terminals performing wireless communication via the each of the frequency channels; transmitting, to a new communication terminal to newly start communication, a notification signal including a number of the one or more communication terminals performing wireless communication via the each of the frequency channels, while the frequency channels are sequentially switched; and transmitting, the one or more communication terminals, a request signal for requesting the one or more communication terminals to transmit acknowledgement signals to the new communication terminal, while the frequency channels are sequentially switched.

In accordance with still another aspect of the present invention, there is provided a program causing a computer to perform wireless communication, the program causing the computer to execute: detecting, for each of the frequency channels, a number of one or more other communication terminals performing wireless communication via the each of the frequency channels, by receiving a notification signal indicating the number from a control device while the frequency channels are sequentially switched; counting, for the each of the frequency channels, a number of one or more other communication terminals performing wireless communication via the each of the frequency channels, by receiving acknowledgement signals transmitted from the one or more other communication terminals while the frequency channels are sequentially switched; and (i) selecting, from the frequency channels, a frequency channel having a least difference between the number detected in the detecting and the number counted in the counting, and (ii) exchanging the signals with the control device via the selected frequency channel.

In accordance with an aspect of the present invention for achieving the object, there is provided an integrated circuit used in a communication terminal performing wireless communication, the integrated circuit comprising: a communication unit configured to exchange signals via a frequency channel selected from a plurality of frequency channels; a first detection unit configured to detect, for each of the frequency channels, a number of one or more other communication terminals performing wireless communication via the each of the frequency channels, by causing the communication unit to receive a notification signal indicating the number from a control device while the frequency channels are sequentially switched; a second detection unit configured to count, for the each of the frequency channels, a number of one or more other communication terminals performing wireless communication via the each of the frequency channels, by causing the communication unit to receive acknowledgement signals transmitted from the one or more other communication terminals while the frequency channels are sequentially switched; and a channel control unit configured to (i) select, from the frequency channels, a frequency channel having a least difference between the number detected by the first detection unit and the number counted by the second detection unit, and (ii) cause the communication unit to exchange the signals with the control device via the selected frequency channel.

The following describes the embodiments according to the present invention with reference to the drawings.

(Embodiment 1)

FIG. 1 is a configuration example of a wireless communication system according to Embodiment 1.

The wireless communication system in FIG. 1 includes: a control device 200 that controls a wireless network; and terminals 100A to 100F that wirelessly communicate with the control device 200 under the control of the control device 200.

In order to control the wireless network, the control device 200 regularly transmits a beacon signal including information for controlling the wireless network.

It is assumed that the communication system has two communication frequency channels which are a frequency channel 1 (hereinafter, referred to as "Ch1") and a frequency channel 2 (hereinafter, referred to as "Ch2"). The control device 200 switches a using communication frequency channel between Ch1 and Ch2 at regular time intervals.

The terminals 100B to 100F are already connected to the control device 200 for the wireless communication. They are referred to already-connected terminals (or "connected terminals"). The terminals 100B and 100C uses Ch2 for the wireless communication with the control device 200. The terminals 100D, 100E, and 100F use Ch1 for the wireless communication with the control device 200. On the other hand, the terminal 100A is a terminal to be newly connected to the control device 200 (hereinafter, referred to also as a "newly-connecting terminal).

Figure 2:
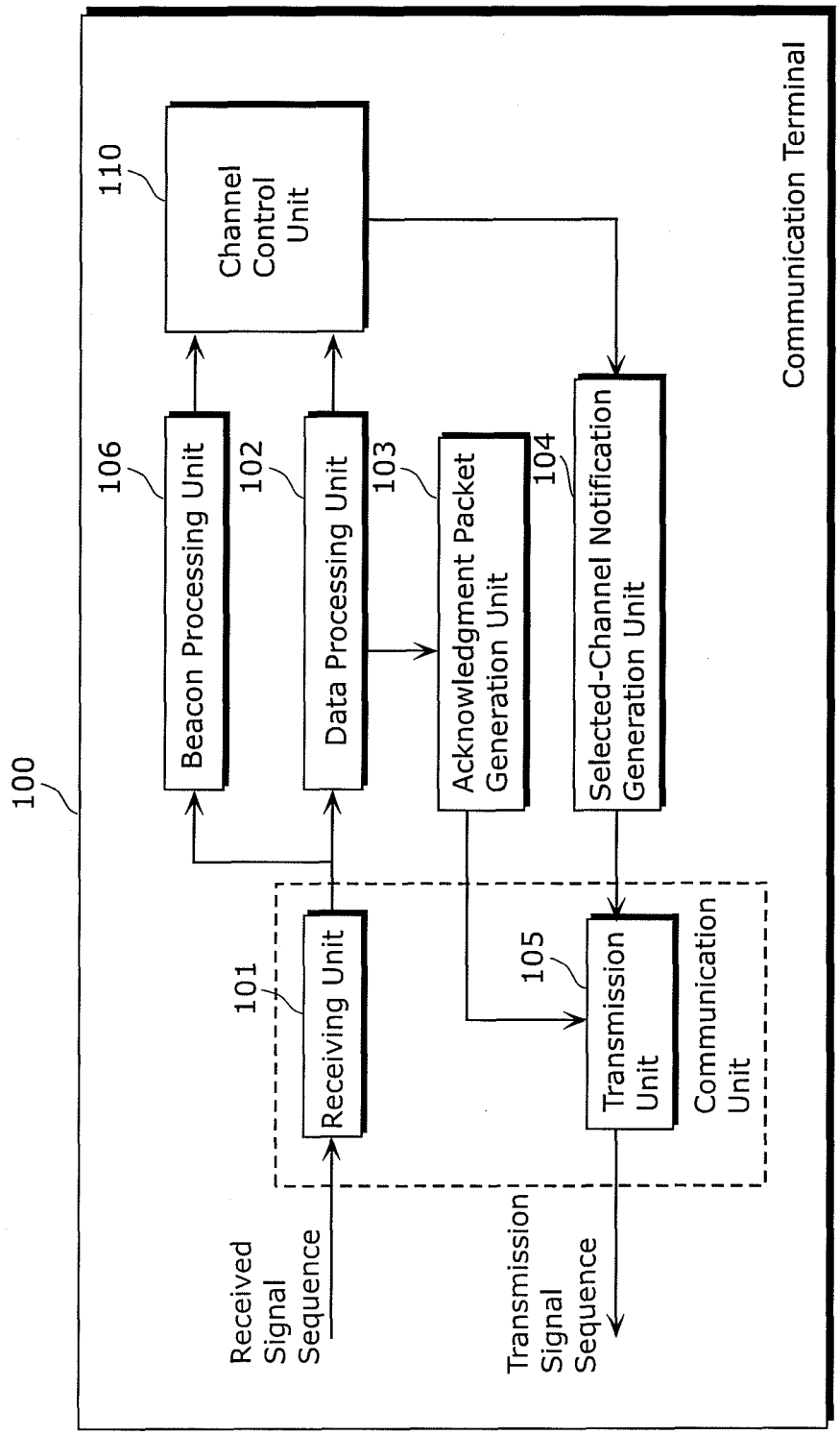
FIG. 2 is a functional block diagram of communication terminal according to Embodiment 1 of the present invention.

FIG. 2 is a functional block diagram of a representative communication terminal 100 according to Embodiment 1.

The communication terminal 100 includes a receiving unit 101, a data processing unit (second detection unit) 102, an acknowledgment packet generation unit 103, a selected-channel notification generation unit 104, a transmission unit 105, a beacon processing unit (first detection unit) 106, and a channel control unit 110.

The receiving unit 101 receives radio signal from an external device (the control device 200 or another communication terminal, the same applies hereinafter). Then, the receiving unit 101 demodulates the received radio signal, and then converts the demodulated signal from analog signal to digital signal (hereinafter, the processing is referred to as A/D conversion).

More specifically, the receiving unit 101 receives a request signal (acknowledgement packet transmission request) and a beacon signal (terminal number notification signal) from the control device 200. In addition, the receiving unit 101 receives acknowledgement signals (acknowledgement packets) from terminals which have already been connected to the control device 200.

The transmission unit 105 converts transmission signal generated by the acknowledgment packet generation unit 103, the selected-channel notification generation unit 104, or the like from digital signal to analog signal (hereinafter, the processing is referred to as D/A conversion). Then, the transmission unit 105 modulates the converted signal, and transmits the modulated signal.

Here, a set of the receiving unit 101 and the transmission unit 105 forms a communication unit. This communication unit exchanges signal with the external device via selected one of the frequency channels. The frequency channel to be used for communication is determined by the channel control unit 110 and then notified to the control device 200.

The data processing unit 102 detects, for each of the frequency channels, the number of the other communication terminals which is found by the acknowledgement signals (acknowledgement packets) received by the receiving unit 101. Furthermore, the data processing unit 102 notifies the acknowledgment packet generation unit 103 of that the receiving unit 101 receives a request signal (acknowledgement packet transmission request).

The beacon processing unit 106 detects, for each of the frequency channels, the number of the other communication terminals (connected-terminal number) performing wireless communication via the frequency channel, based on the beacon signal (terminal number notification signal) received by the receiving unit 101.

The channel control unit 110 compares, for each of the frequency channels, the connected-terminal number obtained from the beacon signal to the connected-terminal number detected using the acknowledgement packets. Therefore, the channel control unit 110 determines whether or not any hidden terminal exists, and thereby selects a frequency channel to be used for communication.

The selected-channel notification generation unit 104 generates a packet for notifying the selected frequency channel to the control device 200 (connection request, selected-channel notification, or the like), and causes the transmission unit 105 to transmit the generated packet.

According to a request for transmitting an acknowledgement packet (hereinafter, referred to also as an "acknowledgement packet transmission request) which is notified from the data processing unit 102, the acknowledgment packet generation unit 103 generates an acknowledgement packet and causes the transmission unit 105 to transmit the acknowledgement packet.

Figure 3:
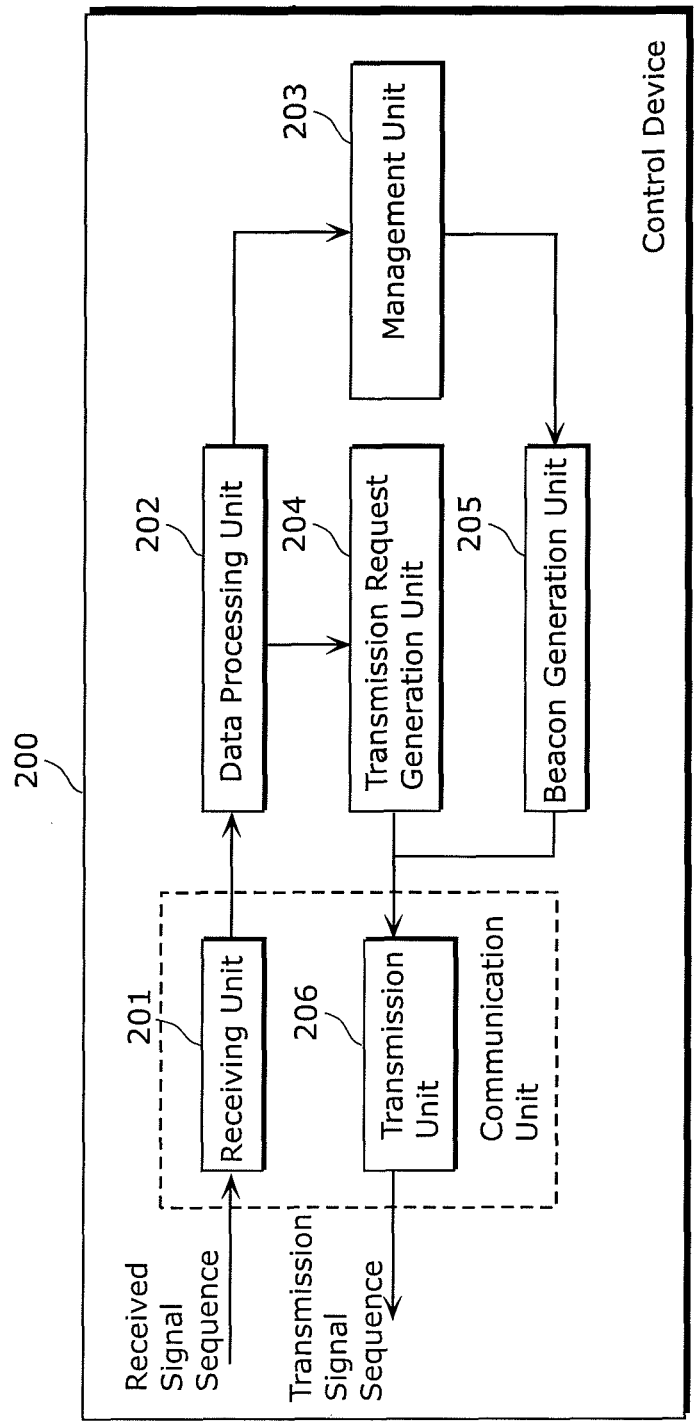
FIG. 3 is a functional block diagram of a control device according to Embodiment 1 of the present invention.

FIG. 3 is a functional block diagram of the control device 200 according to Embodiment 1. The control device 200 includes a receiving unit 201, a data processing unit 202, a management unit 203, a transmission request generation unit 204, a beacon generation unit 205, and a transmission unit 206.

In the same manner as the receiving unit 101, the receiving unit 201 performs the receiving processing such as the A/D conversion and the demodulation.

In the same manner as the transmission unit 105, the transmission unit 206 performs the transmission processing such as the D/A conversion and the modulation. Here, a set of the receiving unit 201 and the transmission unit 206 forms a communication unit.

The data processing unit 202 notifies the transmission request generation unit 204 of that the receiving unit 201 receives order signal. In addition, the data processing unit 202 causes the transmission unit 206 to transmit a connection response in response to a connection request received by the receiving unit 201, and to transmit a selected-channel response in response to the selected-channel notification received by the receiving unit 201.

The management unit 203 manages, for each of the frequency channels available, information regarding already-connected terminals in a communication area. More specifically, the management unit 203 holds, for each of the frequency channels, information and the like for indicating the number of communication terminals wirelessly communicating with the control device 200 and for identifying each of the communication terminals.

The transmission request generation unit 204 generates an acknowledgement packet transmission request for requesting each of the existing terminals to transmit an acknowledgement, and causes the transmission unit 206 to transmit the transmission request.

The beacon generation unit 205 generates a beacon signal. The beacon signal indicates that a frequency channel on which wireless communication is possible is switched to another. More specifically, the beacon signal is transmitted from the control device 200 at predetermined time intervals, while a using frequency channel is sequentially switched. Each of the communication terminals monitors a beacon signal via a certain frequency channel, and thereby recognizes that wireless communication is possible during a predetermined time period from receiving of the beacon signal. The beacon signal includes information indicating the number of communication terminals performing wireless communication via a frequency channel corresponding to the beacon signal. However, the information indicating the number of communication terminals is not necessarily included in a beacon signal, but may be transmitted as a signal different from a beacon signal.

Figure 4A:
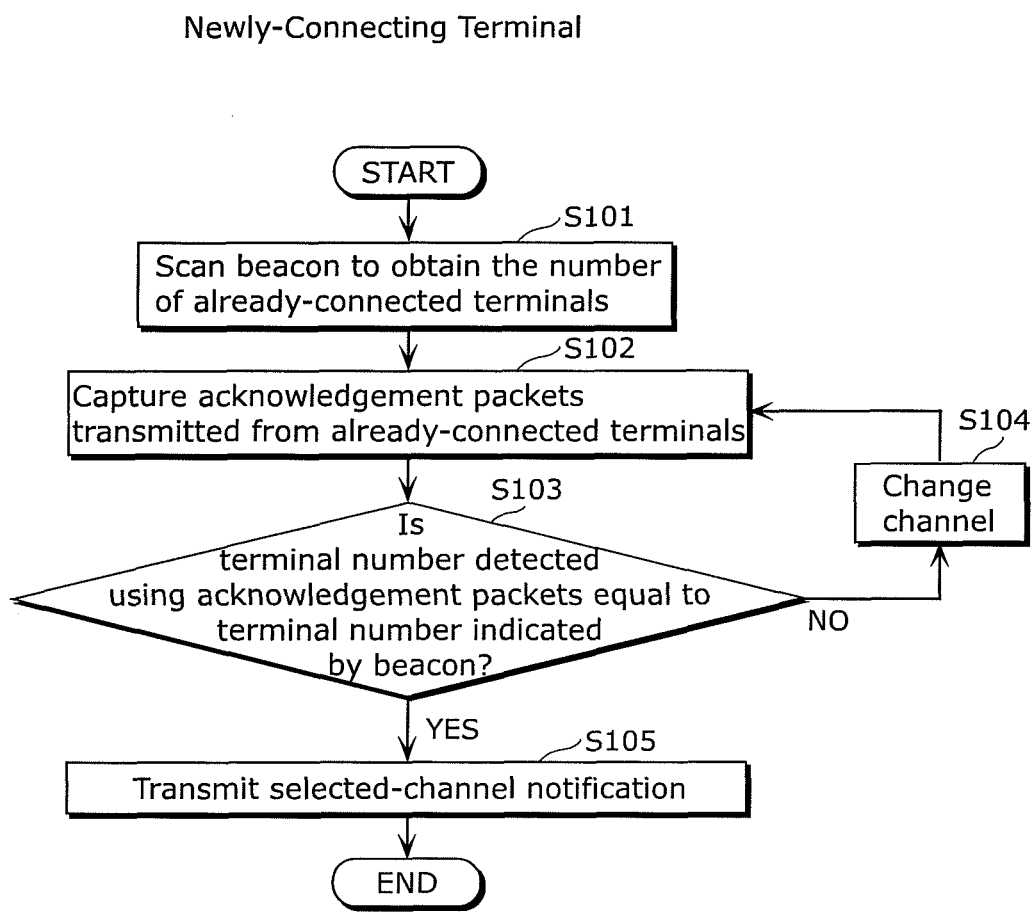
FIG. 4A is a flowchart of processing performed by a newly-connecting terminal according to Embodiment 1 of the present invention.
Figure 4B:
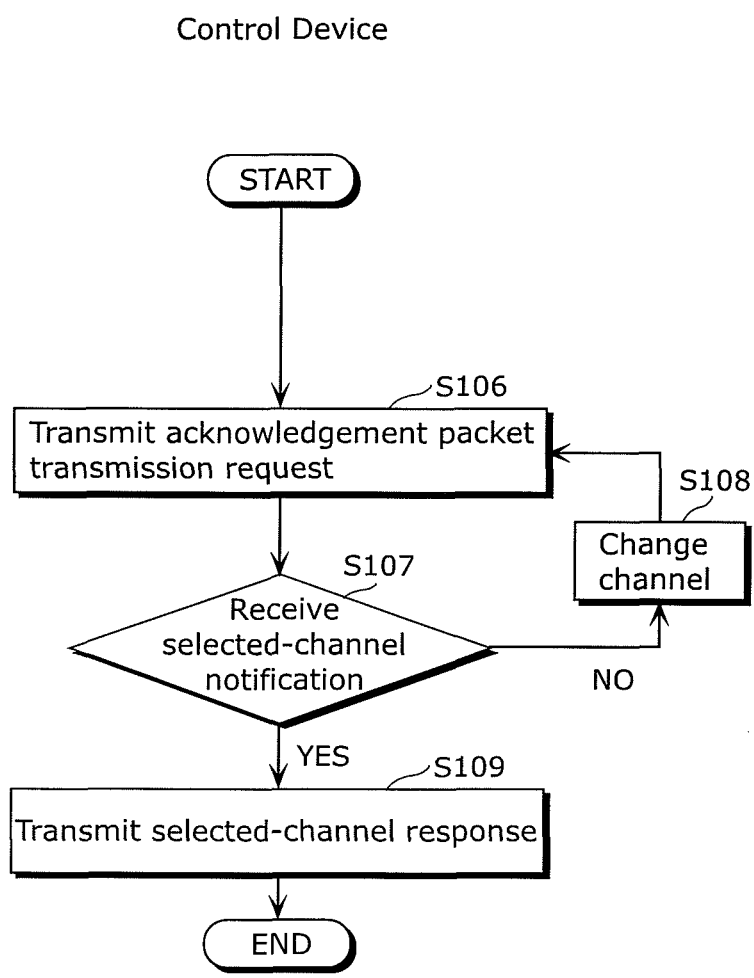
FIG. 4B is a flowchart of processing performed by a control device according to Embodiment 1 of the present invention.
Figure 4C:
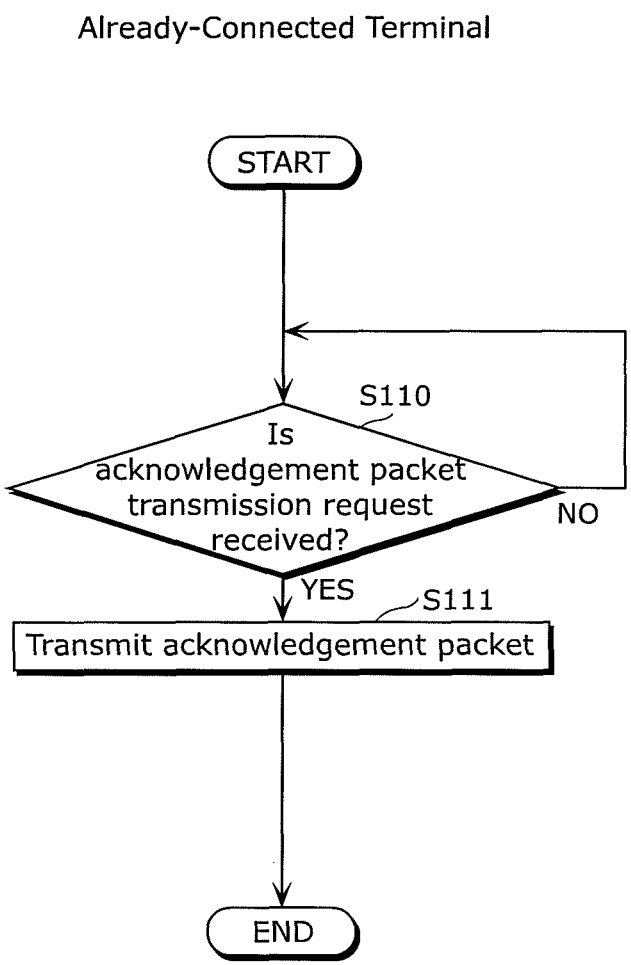
FIG. 4C is a flowchart of processing performed by an already-connected terminal according to Embodiment 1 of the present invention.

Next, the description is given for the processing performed by the terminal 100A as a newly-connecting terminal, the processing performed by the control device 200, and the processing performed by the already-connected terminals 100B to 100F according to Embodiment 1 with reference to FIGS. 4A to 4C, respectively.

FIGS. 4A to 4C are flowcharts of the processing of the terminal 100A, the processing of the control device 200, and the processing of the terminals 100B to 100F, respectively. First, referring to FIG. 4A, the processing performed by the terminal 100A as a newly-connecting terminal is described.

At the beginning, the terminal 100A, which is to be newly connected to the control device 200, performs scanning to receive a beacon signal from the control device 200 (S101).

More specifically, the terminal 100A causes the receiving unit 101 to receive a beacon signal via each of frequency channels, by sequentially switching a frequency channel to another. With reference to the received beacon signal, the beacon processing unit 106 obtains, for each of the frequency channels, information indicating the number of existing terminals currently connected to the control device 200 using the corresponding frequency channel.

Next, the terminal 100A selects one of the frequency channels, and causes the receiving unit 101 to receive acknowledgement packets from the already-connected terminals via the selected frequency channel (the processing is referred to also as "capturing of already-connected terminals"). The data processing unit 102 detects the number of the already-connected terminals using the frequency channel, based on the number of captured acknowledgement packets (S102).

Next, the channel control unit 110 compares the number of the already-connected terminals detected using the captured acknowledgement packets to the number of the already-connected terminals indicated by the beacon signal received via the selected frequency channel (S103).

If the number of the already-connected terminals indicated by the beacon signal is determined as equal to the number of the already-connected terminals detected using the acknowledgement packets (YES at S103), then it is determined that there is no hidden terminal for the newly-connecting terminal 100A via the selected frequency channel.

Therefore, the terminal 100A determines to use the selected frequency channel to wirelessly communicate with the control device 200. Then, the selected-channel notification generation unit 104 causes the transmission unit 105 to transmit a selected-channel notification for notifying the control device 200 of the selected frequency channel (S105).

On the other hand, if the number of the already-connected terminals indicated by the beacon signal is determined as different from the number of the already-connected terminals detected using the acknowledgement packets (NO at S103), then it is determined that there is a hidden terminal for the terminal 100A on the selected frequency channel, and therefore changes the frequency channel to another (S104). After that, the terminal 100A performs the steps S102 and S103 via the newly selected frequency channel.

Next, referring to FIG. 4B, the processing performed by the control device 200 is described.

First, the control device 200 transmits an acknowledgement packet transmission request to each of the already-connected terminals connected to the control device 200 via, for example, Ch1 (S106).

Next, the control device 200 determines whether or not a selected-channel notification, which is transmitted when the newly-connecting terminal 100A selects the frequency channel Ch1, is received from the newly-connecting terminal 100A (S107).

If it is determined that the selected-channel notification is received (YES at S107), then the data processing unit 202 in the control device 200 causes the transmission unit 206 to transmit a selected-channel response in response to the selected-channel notification (S109).

On the other hand, if it is determined that the selected-channel notification is not received (NO at S107), then the control device 200 changes the frequency channel Ch1 to Ch2 (S108). After that, the control device 200 performs the steps S106 and S107 again via Ch2.

Finally, referring to FIG. 4C, the processing performed by each of the already-connected terminals 100B to 100F is described.

First, each of the terminals 100B to 100F determines, on the frequency channel used by the terminal, whether or not an acknowledgement packet transmission request is received from the control device 200 (S110).

In the case of FIG. 1, each of the terminals 100B and 100C determines whether or not the acknowledgement packet transmission request is received via Ch2. On the other hand, each of the terminals 100D to 100F determines whether or not the acknowledgement packet transmission request is received via Ch1.

Next, if it is determined that the acknowledgement packet transmission request is received (YES at S110), the terminals 100B to 100F transmit respective acknowledgement packets by which the newly-connecting terminal 100A detects the already-connected terminals (S111).

More specifically, the acknowledgment packet generation unit 103 in each of the terminals 100B and 100C uses Ch2 to transmit an acknowledgement packet from the transmission unit 105. On the other hand, the acknowledgment packet generation unit 103 in each of the terminals 100D to 100F uses Ch1 to transmit an acknowledgement packet from the transmission unit 105.

On the other hand, if it is determined that the acknowledgement packet transmission request is not received (NO at S110), each of the terminals 1008 to 100F returns to S110.

As described above, in the channel selection to avoid hidden terminals according to Embodiment 1, the beacon signal transmitted by the control device 200 is added with information indicating the number of already-connected terminals using the corresponding frequency channel.

Furthermore, while the newly-connecting terminal is capturing packets transmitted from the already-connected terminals in the communication area, the control device 200 causes the already-connected terminals to transmit acknowledgement packets to ensure the communication.

Therefore, the terminal 100A which is to be newly connected to the control device 200 can detect existence of a hidden terminal and therefore reduce a possibility of the hidden terminal problem.

It should be noted that it has been described in Embodiment 1 that in the wireless communication system as shown in FIG. 1, a frequency channel without hidden terminal is selected from among a plurality of frequency channels, but the present invention is not limited to the above. For example, the present invention offers the same effects also by selecting a control device without hidden terminal from among a plurality of control devices.

It should also be noted that, according to Embodiment 1, an acknowledgement packet may be used to merely detect which terminal connected to the wireless communication system transmits the acknowledge packet. For example, the acknowledgement packet may include only a preamble for signal synchronization or the like in the physical layer, a network ID indicating a connecting network, and a terminal address.

(Embodiment 2)

Figure 5:
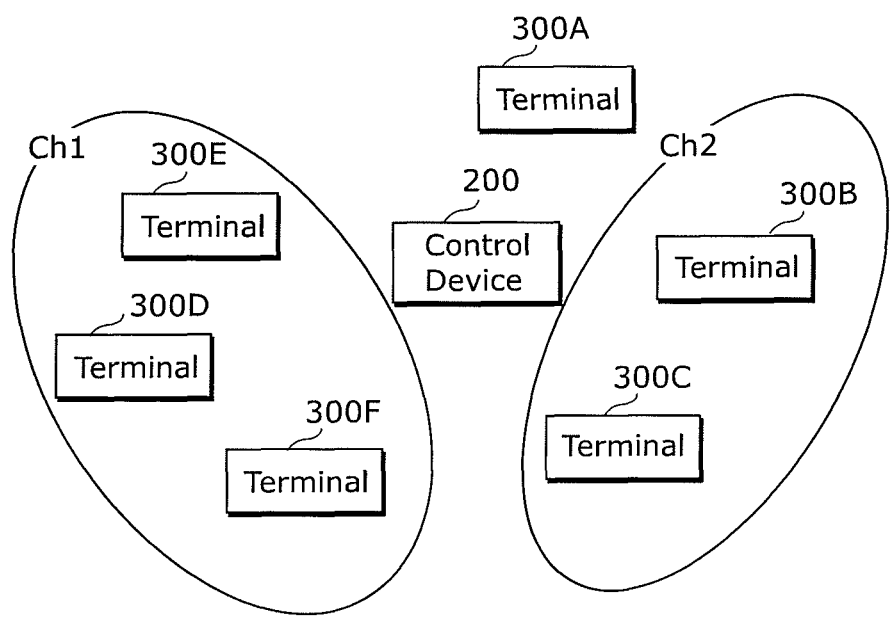
FIG. 5 is a configuration example of a wireless communication system according to Embodiment 2 of the present invention.

FIG. 5 is a configuration example of a wireless communication system according to Embodiment 2.

The wireless communication system in FIG. 5 includes: the control device 200 that controls a wireless network; and terminals 300A to 300F that wirelessly communicate with the control device 200 under the control of the control device 200.

Figure 6:
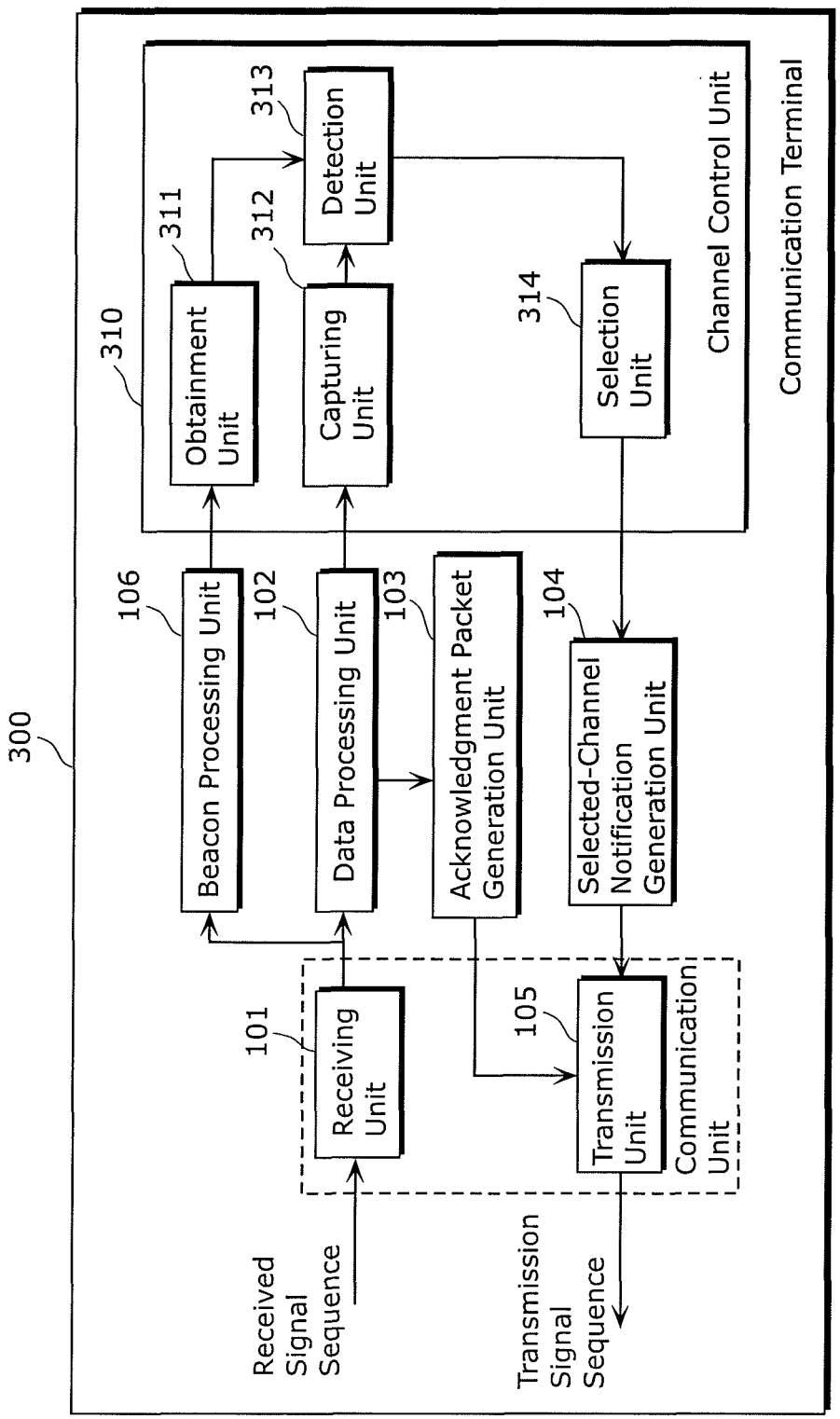
FIG. 6 is a functional block diagram of a communication terminal according to Embodiment 2 of the present invention.

FIG. 6 is a functional block diagram of a representative communication terminal 300 according to Embodiment 3.

The same reference numerals in FIG. 2 are assigned to the identical structural elements in FIG. 6, so that these identical structural elements are not described again below.

In the communication terminal 300 in FIG. 6, the receiving unit 101, the transmission unit 105, the beacon processing unit 106, the data processing unit 102, the acknowledgment packet generation unit 103, and the selected-channel notification generation unit 104 have the same structures as described in Embodiment 1. An example of a channel control unit 310 according to Embodiment 2 is described in detail with reference to FIG. 6.

The channel control unit 310 shown in FIG. 6 includes an obtainment unit 311, a capturing unit (third detection unit) 312, a detection unit 313, and a selection unit 314.

Based on a beacon signal, the obtainment unit 311 obtains the number of already-connected terminals connected to the control device 200 via each of the frequency channels.

The capturing unit 312 captures packets ("acknowledgement packets" in Embodiment 2) transmitted from the already-connected terminals in the communication area, and thereby detects the number of already-connected terminals from which signals can arrive at the representative terminal 300.

The detection unit 313 compares the actual number of already-connected terminals which is obtained from the obtainment unit 311 to the number of already-connected terminals which is the number of terminals (source terminal) transmitting packets successfully captured by the capturing unit 312, so as to detect the number of hidden terminals.

Based on the information regarding hidden terminal which is obtained from the detection unit 313, the selection unit 314 selects a frequency channel to be connected.

Figure 7B:
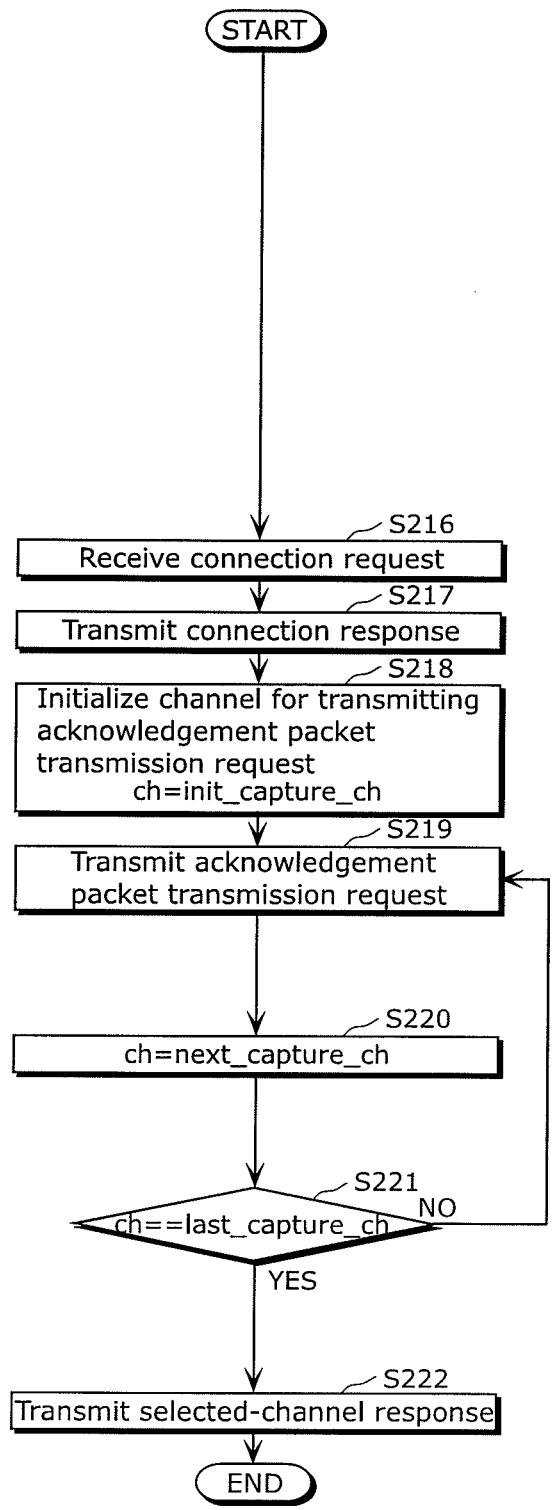
FIG. 7B is a flowchart of processing performed by a control device according to Embodiment 2 of the present invention.

Next, the description is given for the processing performed by the terminal 300A as a newly-connecting terminal, the processing performed by the control device 200, and the processing performed by the already-connected terminals 300B to 300F according to Embodiment 2 with reference to FIGS. 7A to 7C, respectively.

FIGS. 7A to 7C are flowcharts of the processing of the terminal 300A, the processing of the control device 200, and the processing of the terminals 300B to 300F, respectively.

First, referring to FIG. 7A, the processing performed by the terminal 300A as a newly-connecting terminal is described.

The terminal 300A which is to be newly connected to the control device 200 initializes, to init_scan_ch, a value of a frequency channel ch on which a beacon signal is scanned (S201).

Next, the terminal 300A performs scanning to receive a beacon signal from the control device 200, thereby receiving the beacon signal (S202).

Next, from the beacon signal received at S202, the terminal 300A obtains information Nch indicating the number of already-connected terminals currently connected to the control device 200 (S203).

Next, the terminal 300A sets a value of ch to next_scan_ch to change the frequency channel ch for scanning a beacon signal to another (S204).

Next, the terminal 300A determines whether or not the value of ch is last_scan_ch (S205). If it is determined that the value of ch is not yet last_scan_ch (NO at S205), the terminal 300A scans a beacon signal via a next frequency channel ch (S202).

On the other hand, if it is determined that the value of ch is last_scan_ch (YES at S205), then the terminal 300A determines that the beacon scanning is completed and transmits, to the control device 200, a connection request for requesting network connection (S206).

Next, the terminal 300A receives, from the control device 200, a connection response indicating that the connection is permitted, and therefore determines that the connection is completed (S207).

Next, the terminal 300A initializes, to init_capture_ch the value of the frequency channel ch for capturing already-connected terminals already connected to the control device 200 (S208), and then captures acknowledgement packets transmitted from the already-connected terminals (S209).

Next, the terminal 300A obtains the number Cch of already-connected terminals by the capturing (S210). Then, the terminal 300A subtracts Cch which is obtained by the capturing, from the number Nch of already-connected terminals which is obtained based on a beacon, thereby detecting the number of hidden terminals from each of which a signal does not arrive at the terminal 300A (S211).

Next, the terminal 300A sets the value of ch to next_capture_ch in order to change the frequency channel ch for capturing already-connected terminals to another (S212).

Next, the terminal 300A determines whether or not the value of ch is last_capture_ch (S213). If it is determined that the value of ch is not yet last_capture_ch (NO at S213), then the terminal 300A captures already-connected terminals via a next frequency channel ch (S209).

On the other hand, if it is determined that the value of ch is last_capture_ch (YES at S213), then the terminal 300A determines that the already-connected terminal capturing is completed for all of the frequency channels, and selects ch on which the number Hch of hidden terminals is minimum, as a frequency channel ch for wireless communication with the control device 200 (S214).

Finally, the terminal 300A transmits a selected-channel notification to notify the control device 200 of ch selected at S214 for communication (S215).

Next, with reference to FIG. 7B, the processing performed by the control device 200 is described.

First, the control device 200 receives a connection request from the newly-connecting terminal 300A (S216).

Next, the control device 200 transmits a connection response to the terminal 300A to permit the connection request (S217).

Next, the control device 200 initializes, to init_capture_ch, a value of the frequency channel ch on which an acknowledgement packet transmission request is to be transmitted (S218).

The control device 200 transmits the acknowledgement packet transmission request for requesting each of the already-connected terminals to transmit an acknowledgement packet (S219).

Next, the control device 200 sets the value of ch to next_capture_ch to switch the frequency channel ch on which the acknowledgement packet transmission request is to be transmitted (S220).

Next, the control device 200 determines whether or not the value of ch is last_capture_ch (S221). If it is determined that the value of ch is not yet last_capture_ch (NO at S221), then the control device 200 transmits an acknowledgement packet transmission request via a next frequency channel ch (S219).

On the other hand, if it is determined that the value of ch is last_capture_ch (YES at S221), then the control device 200 determines that the terminal 300A has completed the already-connected terminal capturing, and transmits a selected-channel response in response to the selected-channel notification transmitted from the terminal 300A (S222).

The processing regarding already-connected terminals which is shown in FIG. 7C is the same as the processing in FIG. 4C, so that it is not described again.

Figure 8:
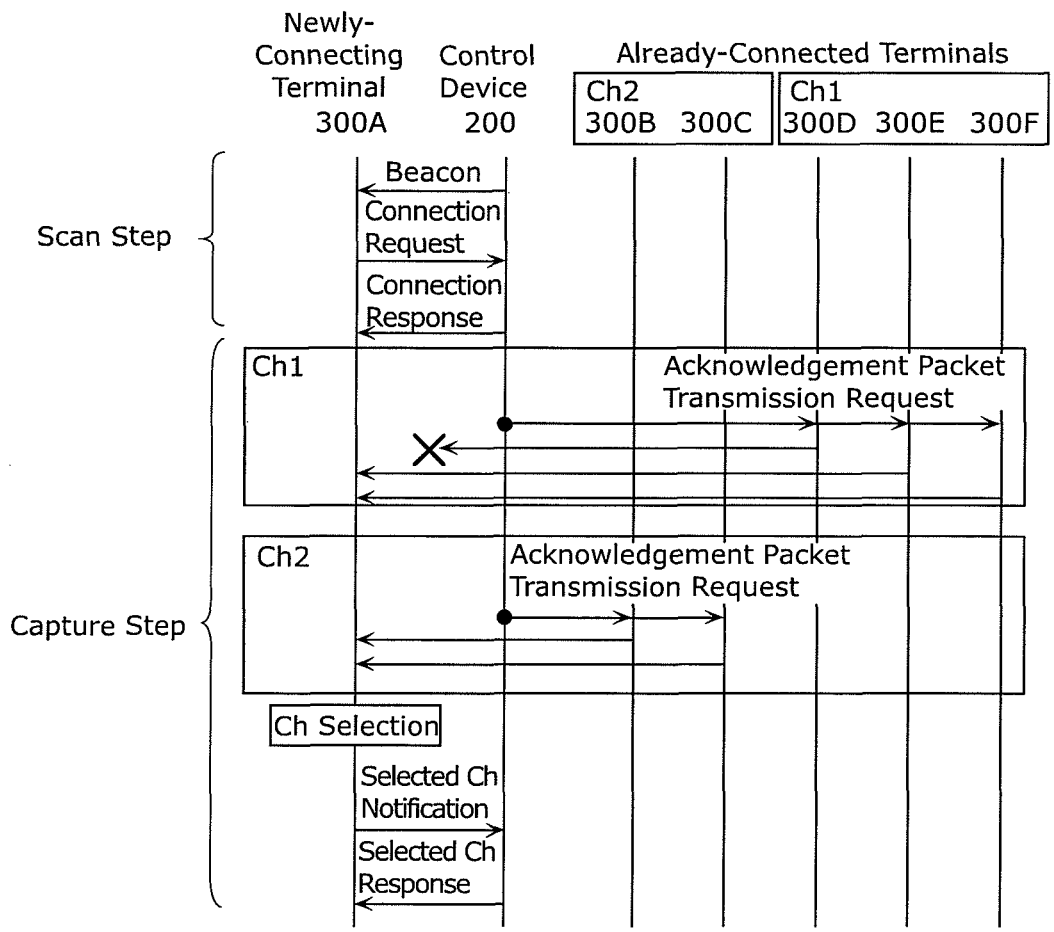
FIG. 8 is a diagram showing an example of a connection sequence according to Embodiment 2 of the present invention.

FIG. 8 is a diagram showing an example of a connection sequence when the terminal 300A attempts to be connected to the control device 200 according to Embodiment 2. In FIG. 8, the connection sequence according to the present embodiment includes main steps: a scan step and a capture step.

First, at the scan step, the terminal 300A scans a beacon signal transmitted as broadcast from the control device 200 at certain time intervals. Here, to each of the frequency channels, an available time period (beacon interval) during which signal exchange is possible via the corresponding frequency channel is assigned. Therefore, the terminal 300A causes the receiving unit 101 to receive a beacon signal, while switching a frequency channel to another once at the available time period.

The terminal 300A scans a beacon signal transmitted from the control device 200 via each of the frequency channels, and transmits a connection request to the control device 200. This connection request serves also as an order signal for ordering each of the other communication terminals 300B to 300F performing wireless communication using the corresponding frequency channel, to transmit an acknowledgement packet transmission request (request signal).

It should be noted that any desired one of the frequency channels may be selected in transmitting the connection request. Here, the selected frequency channel may be temporal and different from a frequency channel eventually determined based on the number of hidden terminals.

In FIG. 8, from the already-connected terminal information included in the beacon signal, the terminal 300A obtains information indicating that three already-connected terminals are connected via Ch1 and two already-connected terminals are connected via Ch1.

On the other hand, in receiving the connection request, the control device 200 transmits a connection response to the terminal 300A to permit connection.

Next, at the capture step, the terminal 300A detects hidden terminals and thereby selects a frequency channel by which influence of hidden terminal problem can be reduced.

In completing the connection to the terminal 300A, the control device 200 transmits an acknowledgement packet transmission request to each of the already-connected terminals 300D to 300F connected to Ch1. For example, the control device 200 may broadcast the acknowledgement packet transmission request via Ch1.

In receiving the acknowledgement packet transmission request from the control device 200, each of the already-connected terminals 300D to 300F transmits an acknowledgement packet. For example, each of the terminals 300D to 300F may broadcast the acknowledgement packet via Ch1.

The terminal 300A captures the acknowledgement packets transmitted from the already-connected terminals via Ch1. In the example of FIG. 8, it is assumed that the terminal 300A captures the acknowledgement packets transmitted from the terminals 300E and 300F via Ch1, but fails to capture an acknowledgement packet from the terminal 300D. Under the assumption, the terminal 300A can detect two already-connected terminals via Ch1.

When the acknowledgement packet transmission from the already-connected terminals via Ch1 is completed, then the control device 200 performs processing via Ch2 next.

In the same manner as described for Ch1, the control device 200 uses Ch2 to broadcast an acknowledgement packet transmission request to the already-connected terminals 300B and 300C connected to Ch2. In receiving the acknowledgement packet transmission request, each of the already-connected terminals 300B and 300C broadcasts an acknowledgement packet via Ch2.

The terminal 300A captures the acknowledgement packets transmitted from the already-connected terminals via Ch2. In the example of FIG. 8, it is assumed that the terminal 300A can capture the acknowledgement packets from the terminals 300B and 300C via Ch2. Under the assumption, the terminal 300A can detect two already-connected terminals via Ch2.

Next, the terminal 300A selects a frequency channel to be used for communication, based on the information indicating the number of already-connected terminals which is indicated by a beacon signal and the information indicating the number of already-connected terminals which is obtained by the capturing unit 312.

For Ch1, the information indicating the number of already-connected terminals which is indicated by a beacon signal indicates three terminals, while the information indicating the number of already-connected terminals which is obtained by the capturing unit 312 indicates two terminals. Therefore, the detection unit 313 determines that the number of hidden terminals on Ch1 is one.

For Ch2, the information indicating the number of already-connected terminals which is indicated by a beacon signal indicates two terminals, while the information indicating the number of already-connected terminals which is obtained by the capturing unit 312 indicates two terminals. Therefore, the detection unit 313 determines that the number of hidden terminals on Ch2 is 0.

Therefore, the terminal 300A selects Ch2 as a frequency channel to be used for communication with the control device 200.

Then, the terminal 300A transmits, to the control device 200, a selected-channel notification for notifying that Ch2 is to be used as a communication frequency channel. The control device 200 transmits a selected-channel response to the terminal 300A in response to the selected-channel notification transmitted from the terminal 300A.

As described as above, according to the present embodiment, the control device 200 transmits an acknowledgement packet transmission request to each of the already-connected terminals 300B to 300F, and each of the terminals 300B to 300F transmits a acknowledgement packet.

Therefore, each of the terminals 300B to 300F surely transmits an acknowledgement packet, so that, even in a wireless communication systems performing access control by CSMA/CA, the terminal 300A as a newly-connecting can capture the number of already-connected terminals.

Furthermore, by adding information regarding the number of already-connected terminals connected to each of the frequency channels to the beacon signal, the terminal 300A can detect the number of already-connected terminals.

Therefore, the newly-connecting terminal can detect: the number of already-connected terminals (source terminals) transmitting signals arrived at the newly-connecting terminal; and the actual number of already-connected terminals. It is therefore possible to recognize a frequency channel without any hidden terminal to increase a possibility of avoiding hidden terminal problem.

In the present embodiment, the number of already-connected terminals or a traffic amount for each frequency channel is not statistically measured, so that it is not necessary to take a long time to obtain correct statistic. As a result, in comparison to the method of measuring statistics of a frequency channel, it is possible to shorten a time required to detect already-connected terminals. Furthermore, even if the number of frequency channels enabling communication is increased, it is possible to prevent the increase of a time required to detect already-connected terminals.

Figure 9:
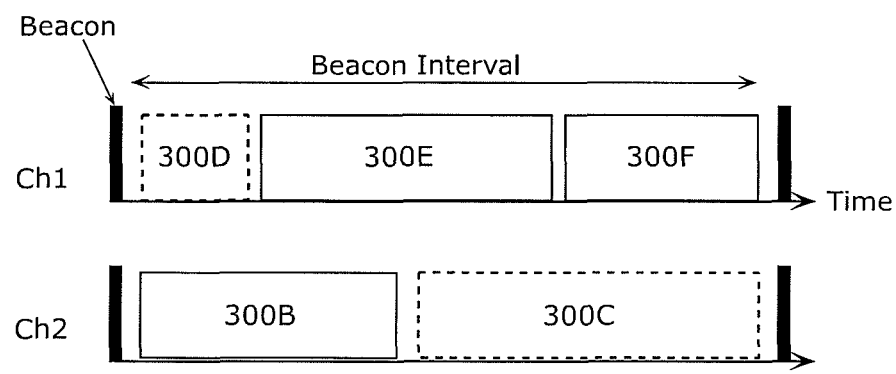
FIG. 9 is a diagram showing a traffic amount of a hidden terminal for each frequency channel according to Embodiment 2 of the present invention.

FIG. 9 is a frequency channel selection method in the case where there are a plurality of frequency channels each having the same minimum hidden terminals. In FIG. 9, it is assumed that, in viewing from the terminal 300A, the terminal 300D is a hidden terminal on Ch1 while the terminal 300C is a hidden terminal on Ch2.

As described above, if each of Ch1 and Ch2 has one hidden terminal, the terminal 300A selects a frequency channel with a less traffic amount of the hidden terminal. In the case of FIG. 9, it is determined that the terminal 300D on Ch1 has a less traffic amount. As a result, Ch1 is selected.

As described above, by selecting a frequency channel with a less traffic amount of a hidden terminal, it is possible to reduce a probability that both the hidden terminal and the terminal itself transmit signals at the same time. It is therefore possible to reduce influence of packet collision caused by hidden terminal problem.

More specifically, in principle, all signals exchanged by the terminals 300B to 300F are relayed by the control device 200. Therefore, the control device 200 measures a traffic amount every predetermined time for each of the terminals 300B to 300F, based on the signal amount exchanged among the terminals 300B to 300F.

On the other hand, if there are a plurality of frequency channels (Ch1, Ch2) having the same number of hidden terminals as described above, the terminal 300A cannot determine which is appropriate to be selected. Therefore, the terminal 300A adds the information for identifying a frequency channel candidate (Ch1, Ch2) and the information for identifying a hidden terminal (terminal 300D on Ch1, terminal 300C on Ch2) for each of the frequency channels are added to a selected-channel notification to be provided to the control device 200.

Then, when receiving such a selected-channel notification, the control device 200 compares the traffic amount of the terminal 300D to the traffic amount of the terminal 300C which are added in the selected-channel notification, and then notifies, by using a selected-channel response, the terminal 300A to select Ch1 used by the terminal 300D with a less traffic amount.

It should be noted that the traffic amount to be compared may be an average value, a maximum value, or a sum of a traffic amount measured in a certain time period, for example. Here, the "certain time period" may be several most-recent beacon intervals, for example.

It should also be noted that the acknowledgement packet transmission request in the present embodiment may be transmitted by either broadcast or uncast. Although each of the already-connected terminals may transmit an acknowledgement packet by CSMA/CA in the autonomous distributed manner, it is also possible to set a transmission order for the already-connected terminals by Time Division Multiple Accesses (TDMA) or by setting different backoff times for the respective terminals. By setting different transmission timings for respective already-connected terminals, it is possible to prevent collision between acknowledgement packets transmitted by the already-connected terminals. It is also possible to use Wideband Code Division Multiple Access (CDMA) and the like.

(Embodiment 3)

Figure 10:
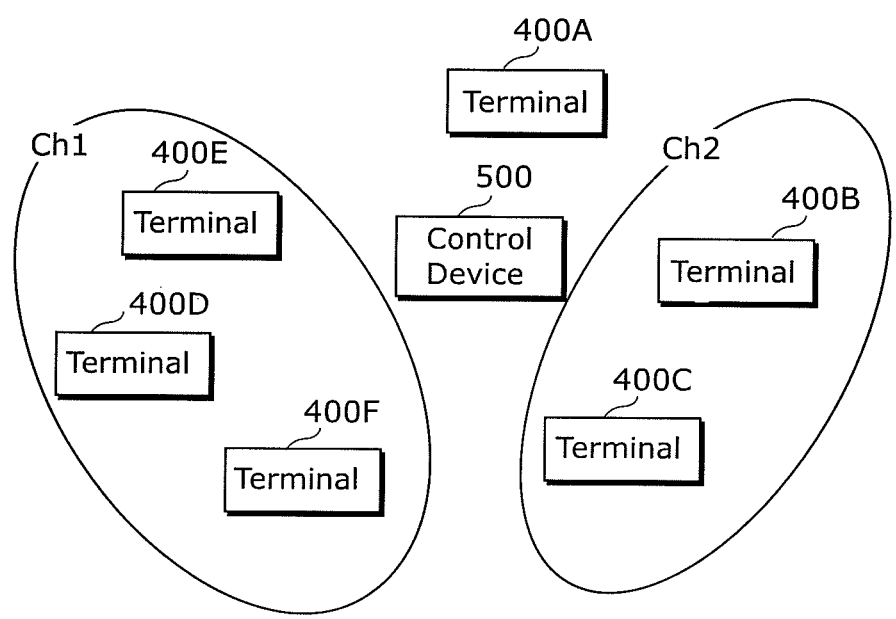
FIG. 10 is a configuration example of a wireless communication system according to Embodiment 3 of the present invention.

FIG. 10 is a configuration example of a wireless communication system according to Embodiment 3.

The wireless communication system shown in FIG. 10 includes: a control device 500 that controls a wireless network; and terminals 400A to 400F that wirelessly communicate with the control device 500 under the control of the control device 500.

The communication terminal according to Embodiment 3 further includes a third detection unit. While the first detection unit is detecting the number of the other communication terminals on each of the frequency channels, the third detection unit causes the communication unit to receive signals transmitted from the communication terminals (source terminals). Therefore, the third detection unit detects the number of terminals (source terminals) transmitting the signals for each of the frequency channels. Then, the channel control unit causes the communication unit to transmit, to the control device, an order signal for ordering the control device to transmit a request signal sequentially to frequency channels in order of a less difference between (a) the number of communication terminals (source terminals) included in the notification signal and (b) the number of transmitting terminals (source terminals).

The control device according to Embodiment 3 causes the communication unit to receive an order signal including the number of communication terminals for each of the frequency channels. The number of communication terminals has already been found by a newly-connecting communication terminal. Then, the control device causes the second signal generation unit to generate a request signal in order of frequency channels with a less difference between the number of communication terminals which is stored in the management unit and the number of communication terminals which is included in the order signal.

Figure 11:
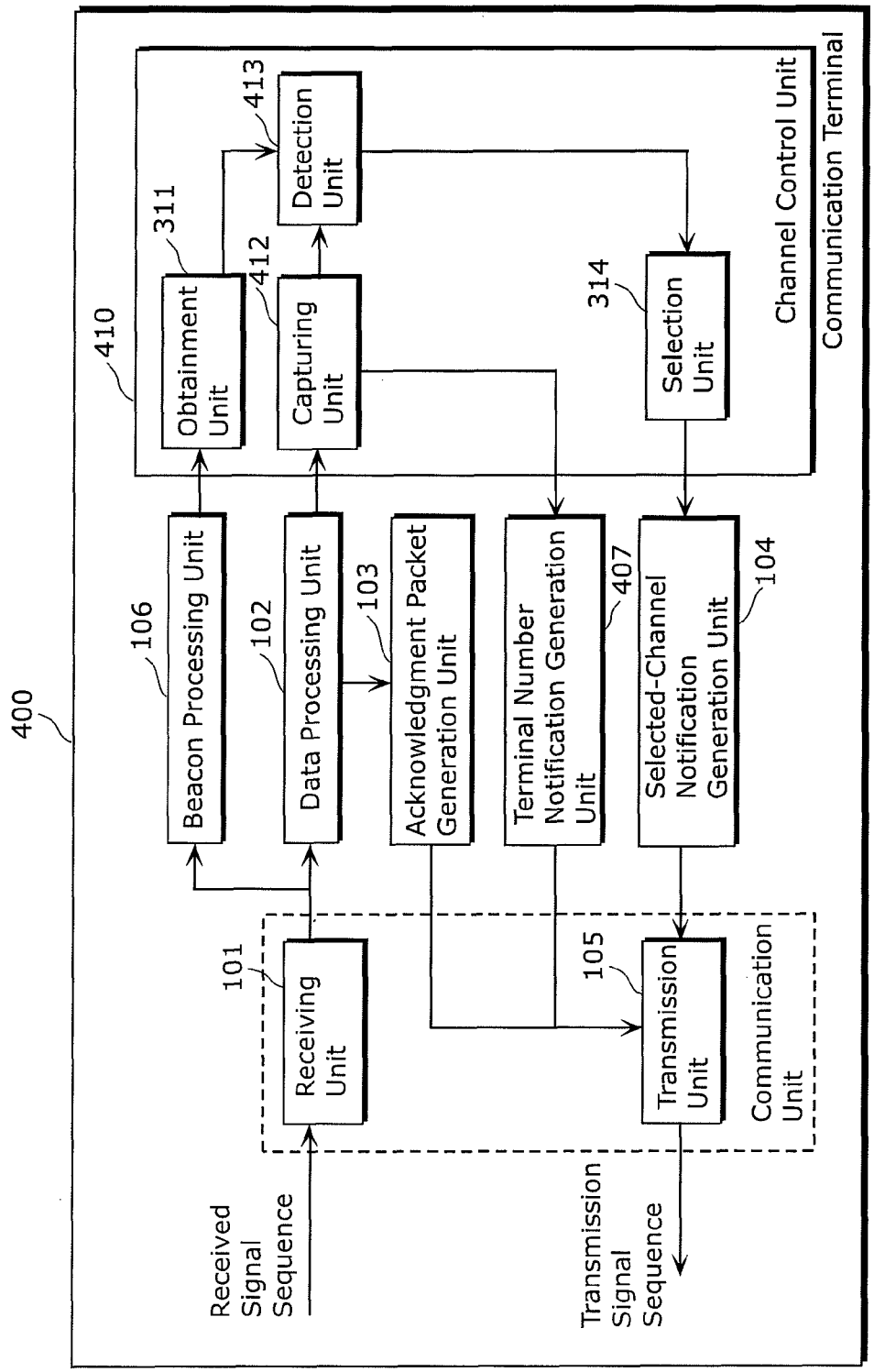
FIG. 11 is a functional block diagram of a communication terminal according to Embodiment 3 of the present invention.

FIG. 11 is a functional block diagram of a representative communication terminal 400 according to Embodiment 3. The same reference numerals in FIG. 6 are assigned to the identical structural elements in FIG. 11, so that these identical structural elements are not described again below.

The communication terminal 400 shown in FIG. 11 differs from the communication terminal 300 shown in FIG. 6 in the functions of the capturing unit 412 and the detection unit 413 and in further including a terminal number notification generation unit 407.

The capturing unit 412 has not only the functions of the capturing unit 312 shown in FIG. 6 but also a function of detecting already-connected terminals during scanning a beacon signal. More specifically, during scanning a beacon signal, the capturing unit 412 captures packets transmitted from the other communication terminals and finds terminals (source terminals) transmitting the packets. Here, the "packets transmitted from the other communication terminals" may include any data and may be transmitted to anywhere. In other words, the capturing unit 412 captures arbitrary signals incidentally transmitted from the other communication terminals and detects the existence of the communication terminals.

Then, the terminal number notification generation unit 407 generates a connection request (order signal) including the number of already-connected terminals which the capturing unit 412 has detected for each of the frequency channels during scanning of a beacon signal, and then causes the transmission unit 105 to transmit the connection request.

The detection unit 413 has not only the functions of the detection unit 313 shown in FIG. 6 but also a timer function of controlling a time period for capturing acknowledgement packets.

Figure 12:
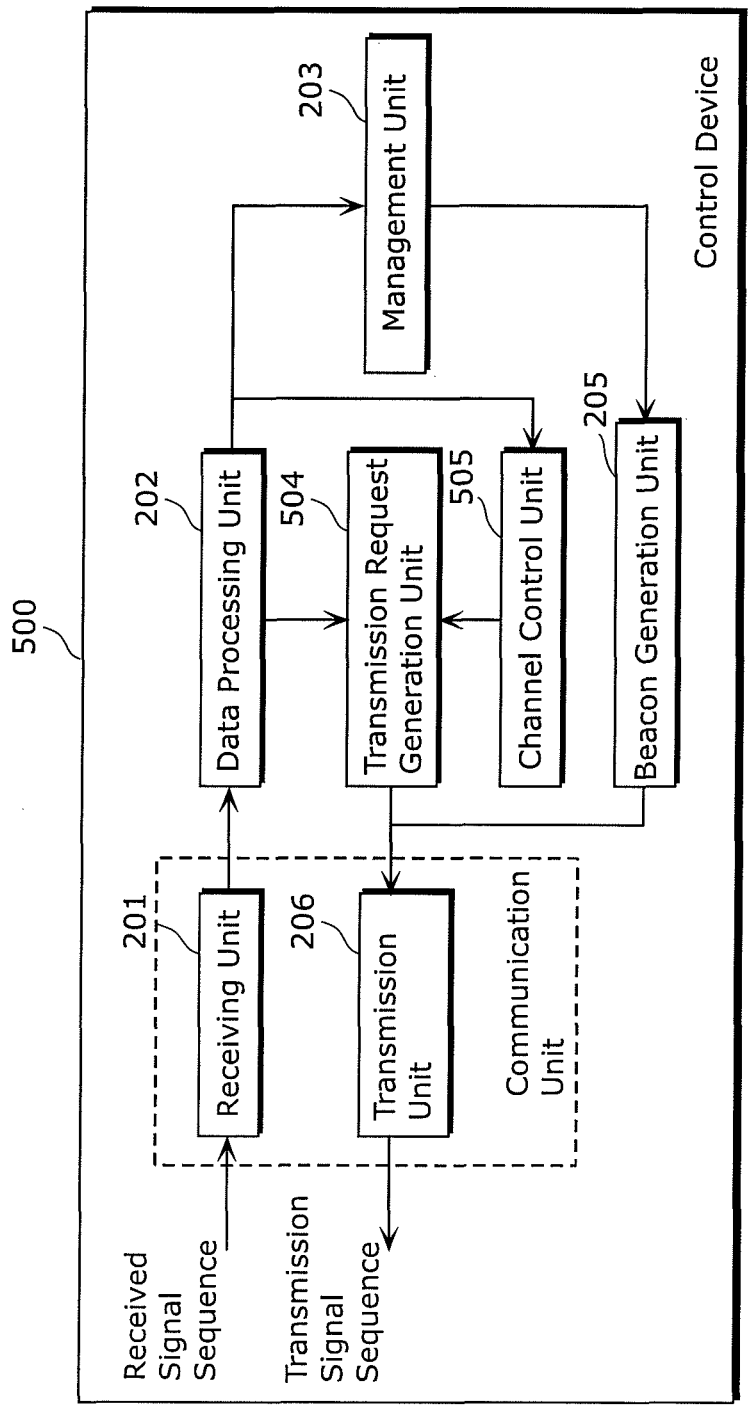
FIG. 12 is a functional block diagram of a control device according to Embodiment 3 of the present invention.

FIG. 12 is a functional block diagram of the control device 500 according to Embodiment 3. The same reference numerals in FIG. 3 are assigned to the identical structural elements in FIG. 12, so that these identical structural elements are not described again below.

The control device 500 shown in FIG. 12 differs from the control device 200 shown in FIG. 3 in the functions of the transmission request generation unit 504 and in further including a channel control unit 505.

The transmission request generation unit 504 has not only the functions of the transmission request generation unit 204 shown in FIG. 3 but also a timer function of controlling a time period during which the newly connecting terminal captures acknowledgement packets.

The channel control unit 505 determines an order of selecting frequency channels to transmit an acknowledgement packet transmission request, based on a captured-terminal number notification notified from the communication terminal 400.

Figure 13A:
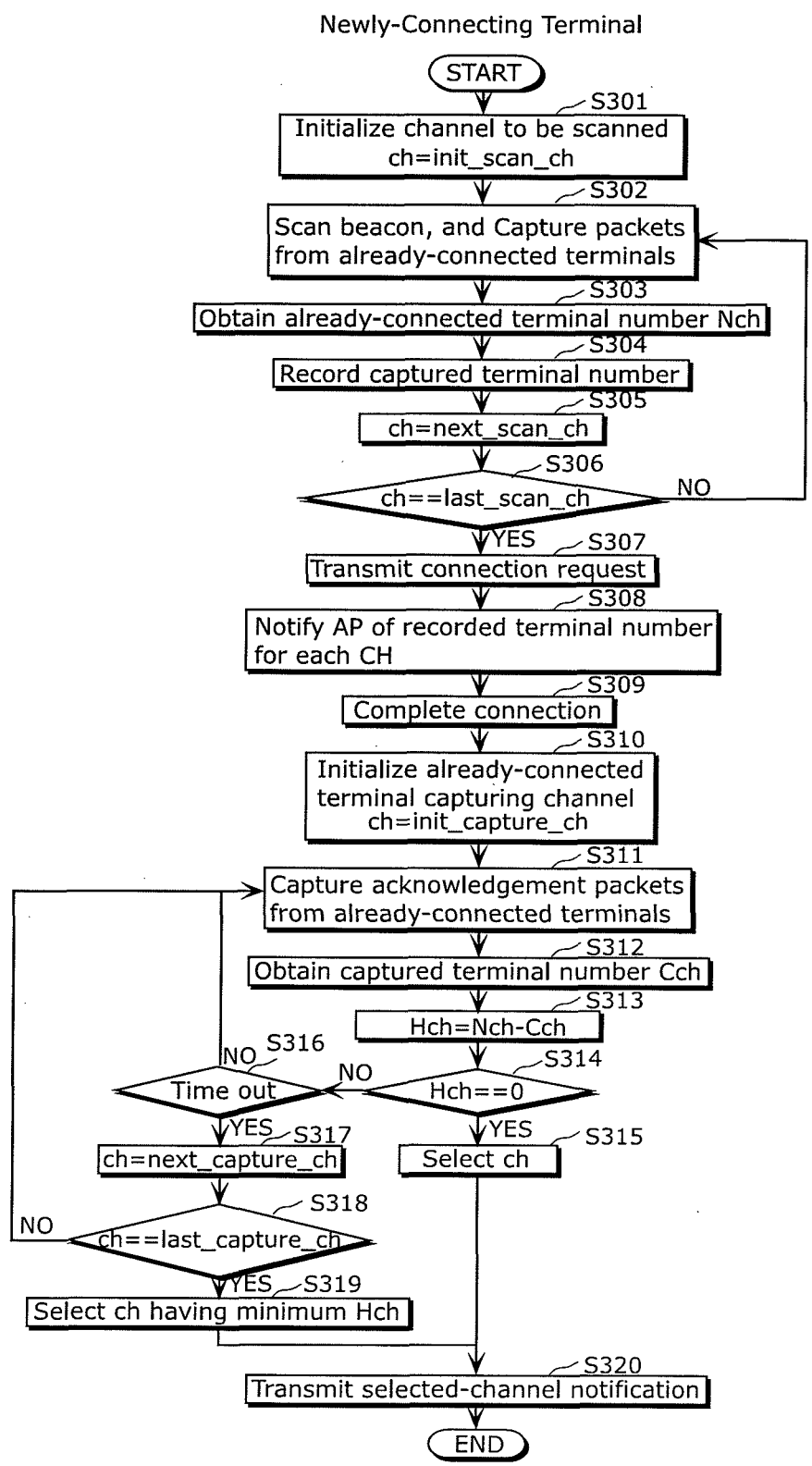
FIG. 13A is a flowchart of processing performed by a newly-connecting terminal according to Embodiment 3 of the present invention.
Figure 13C:
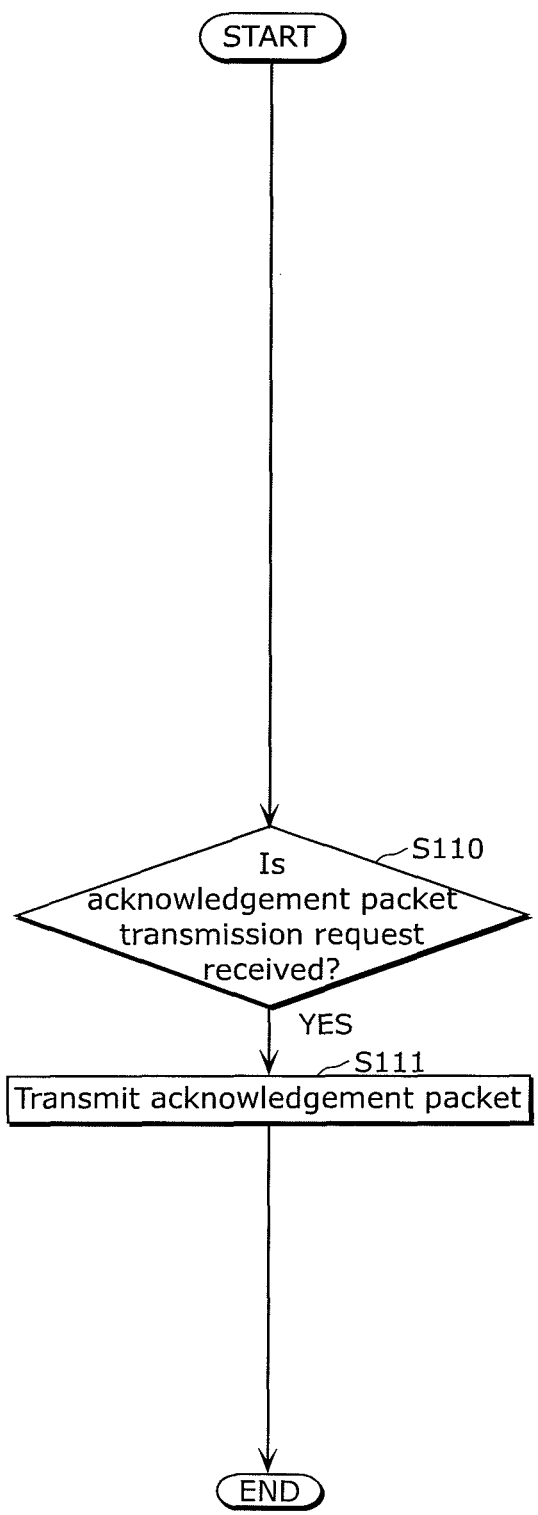
FIG. 13C is a flowchart of processing performed by an already-connected terminal according to Embodiment 3 of the present invention.

Next, the description is given for the processing performed by the terminal 400A as a newly-connecting terminal, the processing performed by the control device 500, and the processing performed by the already-connected terminals 400B to 400F according to Embodiment 3 with reference to FIGS. 13A to 13C, respectively.

FIGS. 13A to 13C are flowcharts of the processing of the newly-connecting terminal 400A, the processing of the control device 500, and the processing of the terminals 400B to 400F according to Embodiment 3, respectively.

First, referring to FIG. 13A, the processing performed by the terminal 400A as a newly-connecting terminal is described.

The terminal 400A which is to be newly connected to the control device 500 initializes, to init_scan_ch, a value of a frequency channel ch on which a beacon signal is scanned (S301).

Next, the terminal 400A performs scanning to receive a beacon signal from the control device 500, thereby receiving the beacon signal (S302).

Next, the terminal 400A uses a currently using frequency channel (initscan_ch) to obtain, from the beacon signal received at S302, the information Nch indicating the number of already-connected terminals connected to the control device 500 (S303).

Furthermore, the capturing unit 412 in the terminal 400A captures signals from the already-connected terminals during scanning the beacon signal from the control device 500, and records the number of already-connected terminals captured in the scanning (S304).

Next, the terminal 400A sets a value of ch to next_scan_ch to change the frequency channel ch for scanning a beacon signal to another (S305).

Next, the terminal 400A determines whether or not the value of ch is last_scan_ch (S306). If it is determined that the value of ch is not yet last_scan_ch (NO at S306), the terminal 400A scans a beacon signal via a next frequency channel ch (S302).

On the other hand, if it is determined that the value of ch is last_scan_ch (YES at S306), then the terminal 400A determines that the beacon scanning is completed and transmits, to the control device 500, a connection request for requesting network connection (S307).

Furthermore, the terminal 400A notifies the control device 500 of the number of already-connected terminals of each of the frequency channels which is recorded at S304 (S308). Here, the number of already-connected terminals which is detected for each of the frequency channels may be transmitted being included in the connection request at S307, or may be transmitted as a signal different from the connection request.

Next, from the control device 500, the terminal 400A receives a connection response for permitting connection. Eventually, the terminal 400A has been connected to the control device 500 (S309).

Next, the terminal 400A initializes, to init_capture_ch, a value of frequency channel ch on which the already-connected terminals connected to the control device 500 are captured (S310).

Next, the terminal 400A captures acknowledgement packets transmitted from the already-connected terminals (S311). Here, at a time of starting the acknowledgement packet capturing, the detection unit 413 starts timer monitoring to control a time period for capturing acknowledgement packets.

Next, the terminal 400A obtains the number Cch of already-connected terminals by the capturing (S312).

Next, by subtracting Cch detected by the capturing from the number Nch of already-connected terminals obtained by the beacon signal, the terminal 400A detects the number Hch of hidden terminals from which signals do not arrive at the terminal 400A (S313).

Next, the terminal 400A determines whether or not the number Hch of hidden terminals is 0 (S314).

If it is determined that the number Hch of hidden terminals is 0 (YES at S314), then the terminal 400A selects the currently using frequency channel ch as a frequency channel to be used for communication (S315). Furthermore, the terminal 400A transmits a selected-channel notification to the control device 500 to notify the frequency channel selected at S315 (S320).

On the other hand, if it is determined that the number Hch of hidden terminals is not 0 (NO at S314), then the terminal 400A determines that there is an already-connected terminal not detected by the terminal 400A, and further determines whether or not the time period for capturing already-connected terminals is timed out on the frequency channel ch (S316).

If it is determined that the time period for capturing already-connected terminals remains (No at S316), then the terminal 400A continues capturing of acknowledgement packets transmitted from already-connected terminals (S311).

On the other hand, if it is determined that the time period for capturing already-connected terminals is timed out (YES at S316), then the terminal 400A sets the value of ch to next_capture_ch to which the frequency channel ch on which already-connected terminals are captured (S317).

Next, the terminal 400A determines whether or not the value of ch is last_capture_ch (S318). If it is determined that the value of ch is not yet last_capture_ch (NO at S318), then the terminal 400A captures already-connected terminals via a next frequency channel ch (S311). On the other hand, if it is determined that the value of ch is last_capture_ch (YES at S318), then the terminal 400A determines that the capturing of already-connected terminals is completed and selects a frequency channel having a minimum number Hch of hidden terminals as a frequency channel ch to be used for communication (S319).

Next, with reference to FIG. 13B, the processing performed by the control device 500 is described.

First, the control device 500 receives a connection request from the terminal 400A (S321).

Next, based on the number of captured already-connected terminals for each of the frequency channels which is notified from the terminal 400A, the control device 500 determines an order of selecting frequency channels to transmit an acknowledgement packet transmission request, so that a frequency channel with a less number of already-connected terminals not yet captured by the 400A is selected earlier (S322).

Next, the control device 500 transmits a connection response to the terminal 400A to permit the connection request (S323).

Next, the control device 500 initializes, to init_capture_ch, a value of the frequency channel ch on which an acknowledgement packet transmission request is to be transmitted (S324).

Next, the control device 500 transmits the acknowledgement packet transmission request for requesting each of the already-connected terminals to transmit an acknowledgement packet (S325).

Next, the control device 500 determines whether or not the selected-channel notification is received from the terminal 400A (S326). If it is determined that the selected-channel notification is received (YES at S326), then the control device 500 transmits a selected-channel response in response to the selected-channel notification transmitted from the terminal 400A (S327).

On the other hand, if it is determined that the selected-channel notification is not received (NO at S326), then the control device 500 determines whether or not the time period for capturing already-connected terminals by the terminal 400A is timed out (S328). If it is determined that the time period for capturing already-connected terminals remains (NO at S328), then the control device 500 continues monitoring of a selected-channel notification (S326).

On the other hand, if it is determined that the time period for capturing already-connected terminals is timed out (YES at S328), then the control device 500 sets the value of ch to next_capture_ch to switch the frequency channel ch on which an acknowledgement packet transmission request is transmitted (S329).

Next, the control device 500 determines whether or not the value of ch is last_capture_ch (S330). If it is determined that the value of ch is not yet last_capture_ch (NO at S330), then the control device 500 transmits an acknowledgement packet transmission request via a next frequency channel ch (S325).

On the other hand, if it is determined that the value of ch is last_capture_ch (YES at S330), then the control device 500 determines that the capturing of already-connected terminals is completed and proceeds to S327.

The flow of each of the already-connected terminals 400B to 400F shown in FIG. 13C is the same as FIG. 4C, so that it is not described again.

Figure 14:
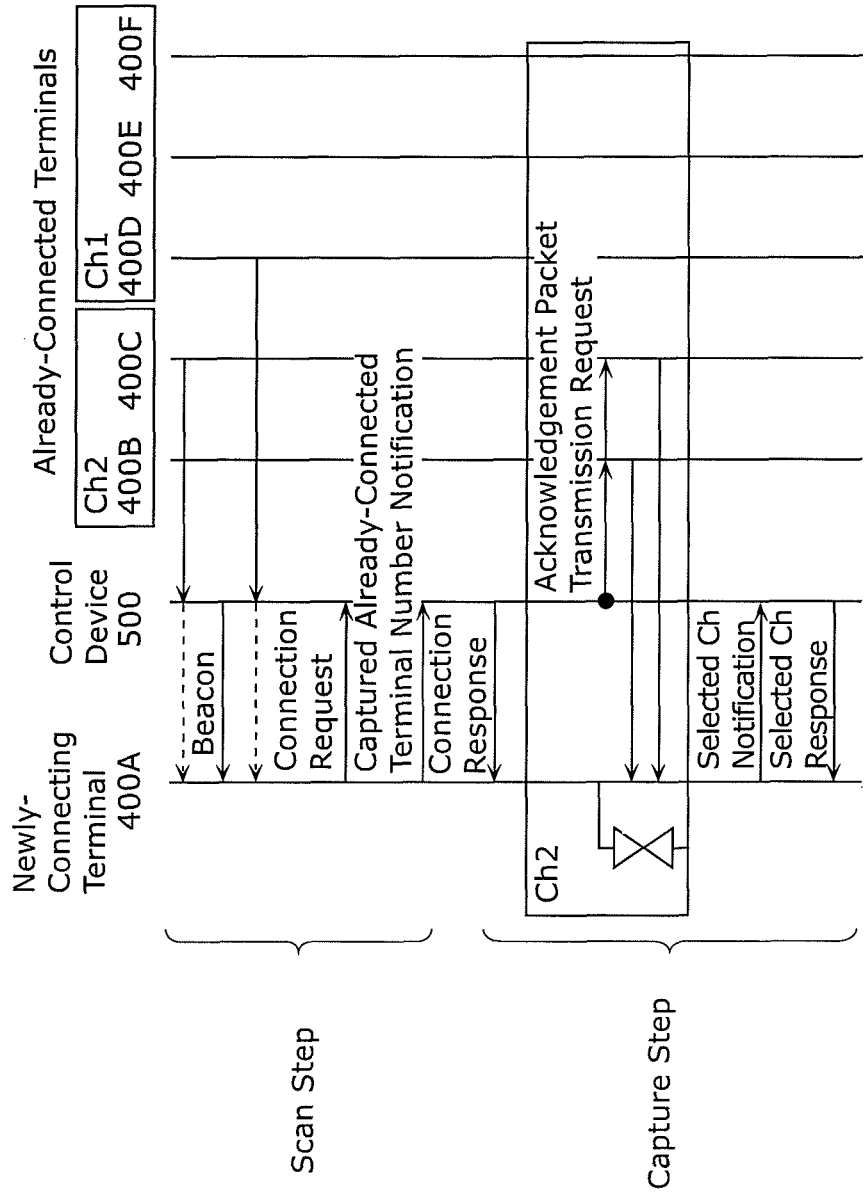
FIG. 14 is a diagram showing an example of a connection sequence according to Embodiment 3 of the present invention.

FIG. 14 shows an example of a connection sequence when the terminal 400A attempts to be connected to the control device 500 according to Embodiment 3. In FIG. 14, the connection sequence according to the present embodiment includes a scan step and a capture step.

First, at the scan step, the terminal 400A scans a beacon signal transmitted from the control device 500 at certain time intervals. At the same time as the beacon scanning, the terminal 400A also captures signals from the already-connected terminals.

After scanning a beacon signal transmitted from the control device 500, the terminal 400A transmits, to the control device 500, a connection request and the number of already-connected terminals captured in the beacon scanning.

In FIG. 14, from the already-connected terminal information included in the beacon signal, the terminal 400A is notified of that there are three already-connected terminals on Ch1 and two already-connected terminals on Ch2. Since signals have been received from the terminals 400C and 400D, one already-connected terminal has been captured via the frequency channel Ch1, and one already-connected terminal has been captured via the frequency channel Ch2.

On the other hand, after receiving the connection request from the terminal 400A, the control device 500 transmits a connection response for permitting the terminal 400A to be connected. Furthermore, based on the number of captured already-connected terminals for each of the frequency channels which is notified from the terminal 400A, the control device 500 determines an order of selecting frequency channels to transmit an acknowledgement packet transmission request, so that a frequency channel with a less number of already-connected terminals not yet captured by the 400A is selected earlier.

In FIG. 14, since the terminal 400A has already captured one already-connected terminal on the frequency channel Ch1 and one already-connected terminal on the frequency channel Ch2. Therefore, the number of already-connected terminals which have not yet been captured is two on Ch1 and one on Ch1. Therefore, the control device 500 switches frequency channels in order of Ch2 and then Ch1, in order to transmit an acknowledgement packet transmission request.

Next, at the capture step, hidden terminals are detected, and thereby a frequency channel by which influence of hidden terminal problem can be reduced is selected.

In completing the connection to the terminal 400A, the control device 500 transmits an acknowledgement packet transmission request to each of the already-connected terminals 400B and 400C connected to Ch2. In receiving the acknowledgement packet transmission request, each of the already-connected terminals 400B and 400C transmits an acknowledgement packet. The terminal 400A captures the acknowledgement packets transmitted from the already-connected terminals via Ch2.

In the example of FIG. 14, the terminal 400A can capture acknowledgement packets from the already-connected terminals 400B and 400C via Ch2. In other words, the terminal 400A can detect two already-connected terminals on Ch2.

Next, based on the number of already-connected terminals which is included in the beacon signal and the information obtained by the capturing unit 412, the terminal 400A determines that all of already-connected terminals on Ch2 have been captured, and then selects Ch2 as a frequency channel to be used for communication.

By using a selected-channel notification, the terminal 400A notifies the control device 500 of that Ch2 is selected as a frequency channel to be used for communication. The control device 500 transmits a selected-channel response to the terminal 400A in response to the information notified from the terminal 400A.

As described above, in the channel selection for avoiding hidden terminals according to Embodiment 3, the newly-connecting terminal captures also signals transmitted from the already-connected terminals in the beacon scanning. It is therefore possible to perform the already-connected terminal capturing by selecting frequency channels in order of decreasing the number of already-connected terminals not yet captured by the newly-connecting terminal. As a result, it is possible to shorten a time period for capturing already-connected terminals.

Moreover, if a timer for controlling the time period for capturing already-connected terminals is provided and it is possible to capture all of the already-connected terminals connected on a frequency channel in a certain time period, connection to the frequency channel can shorten the time period for capturing already-connected terminals, because it is not necessary to capture already-connected terminals for all of the frequency channels.

For example, in FIG. 14, the already-connected terminal capturing is necessary only for the frequency channel Ch2, so that capturing for Ch1 can be eliminated. As a result, it is possible to significantly shorten a time period for capturing already-connected terminals.

It should be noted that it has been described in Embodiment 3 that a frequency channel is selected in the already-connected terminal capturing in order of decreasing the number of already-connected terminals not yet captured by the newly-connecting terminal, but the present invention is not limited to the above. For example, the order of frequency channels in the capturing may be determined based on the situation of each of the frequency channels, such as signal power, interference power, or the number of accommodated terminals. Here, the signal power may be measured by a beacon, a connection request, a connection response, or the like. Furthermore, the interference amount or the number of accommodated terminals for each of the frequency channels may be detected by the control device 500.

It is further possible to start the already-connected terminal capturing from the same frequency channel as that used for an already-connected terminal determined as having a highest received power during the beacon scanning of the newly connecting terminal. It is considered that a terminal most positioned close to the newly-connecting terminal has correlation with terminal in the receiving circumstances. Therefore, by starting the already-connected terminal capturing from the same frequency channel as that used for the terminal positioned close to the newly-connecting terminal, it is possible to increase a probability of selecting a frequency channel without hidden terminal in the first capturing.

(Embodiment 4)

Figure 15:
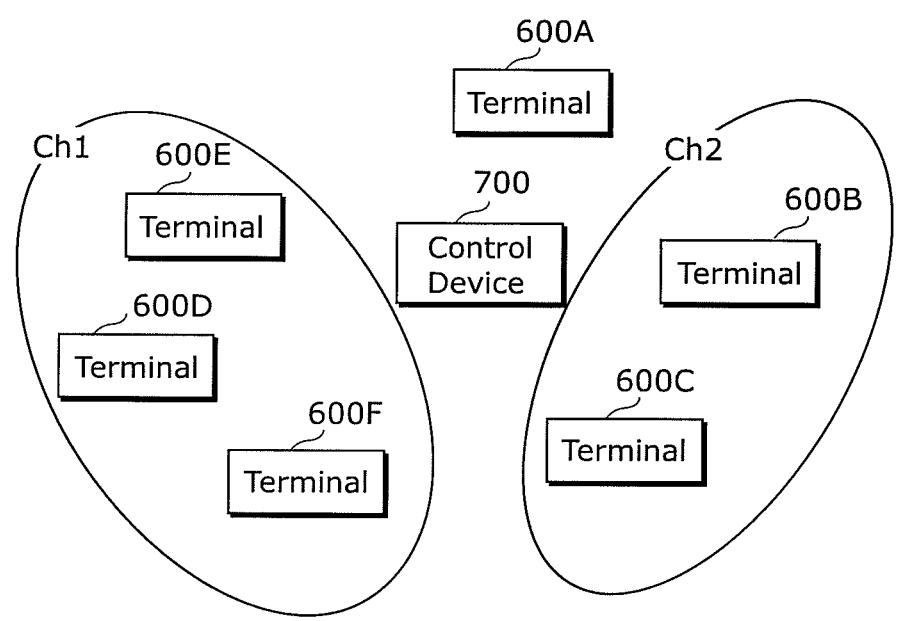
FIG. 15 is a configuration example of a wireless communication system according to Embodiment 4 of the present invention.

FIG. 15 is a configuration example of a wireless communication so system according to Embodiment 4.

The wireless communication system shown in FIG. 15 includes: a control device 700 that controls a wireless network; and terminals 600A to 600F that wirelessly communicate with the control device 700 under the control of the control device 700.

The communication terminal according to Embodiment 4 further includes a third detection unit. While the first detection unit is detecting the number of the other communication terminals on each of the frequency channels, the third detection unit causes the communication unit to receive signals transmitted from the other communication terminals. Therefore, the third detection unit detects information for identifying terminals (source terminals) transmitting the signals for each of the frequency channels. Then, the channel control unit causes the communication unit to transmit an order signal for ordering the control device to transmit a request signal only to a communication terminal which the third detection unit cannot detect.

Figure 16:
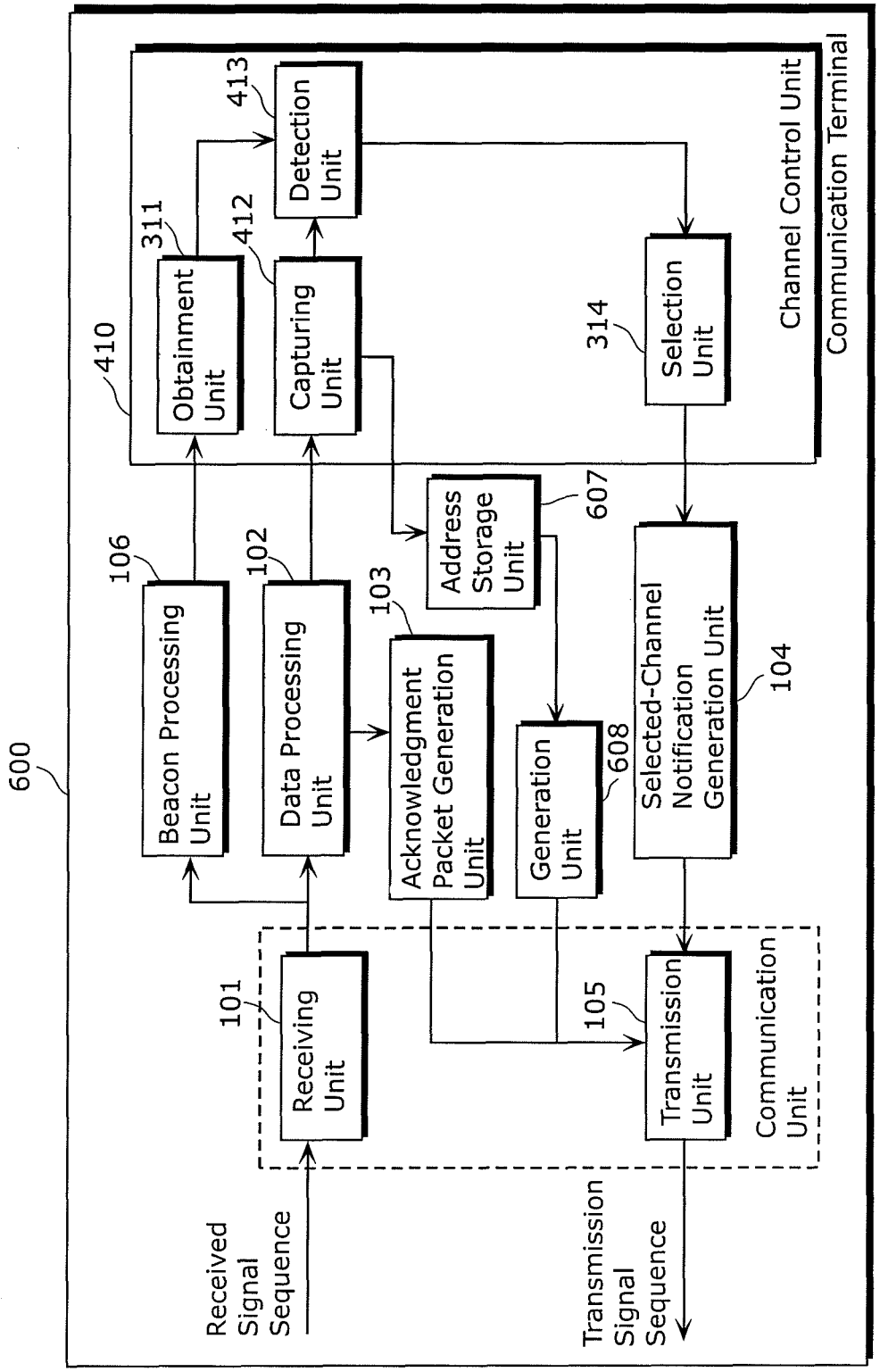
FIG. 16 is a functional block diagram of a communication terminal according to Embodiment 4 of the present invention.

FIG. 16 is a functional block diagram of a representative communication terminal 600 according to Embodiment 4.

The same reference numerals in FIG. 11 are assigned to the identical structural elements in FIG. 16, so that these identical structural elements are not described again below.

The communication terminal 600 shown in FIG. 16 differs from the communication terminal 400 shown in FIG. 11 in further including an address storage unit 607 and a generation unit 608.

The address storage unit 607 records addresses of captured already-connected terminals (information for identifying the already-connected terminals), while the capturing unit 412 is scanning a beacon signal.

The generation unit 608 causes the transmission unit 105 to transmit, to the control device 500, already-connected terminal address notification including addresses of the captured already-connected terminals. The addresses are stored in the address storage unit 607.

The control device according to Embodiment 4 further includes a channel control unit. The channel control unit causes the communication unit to receive the order signal including the information for indentifying the communication terminals which the newly-connecting communication terminal has already found, and causes the second signal generation unit to generate a request signal to be transmitted to only a communication terminal which the newly-connecting communication terminal cannot find.

Figure 17:
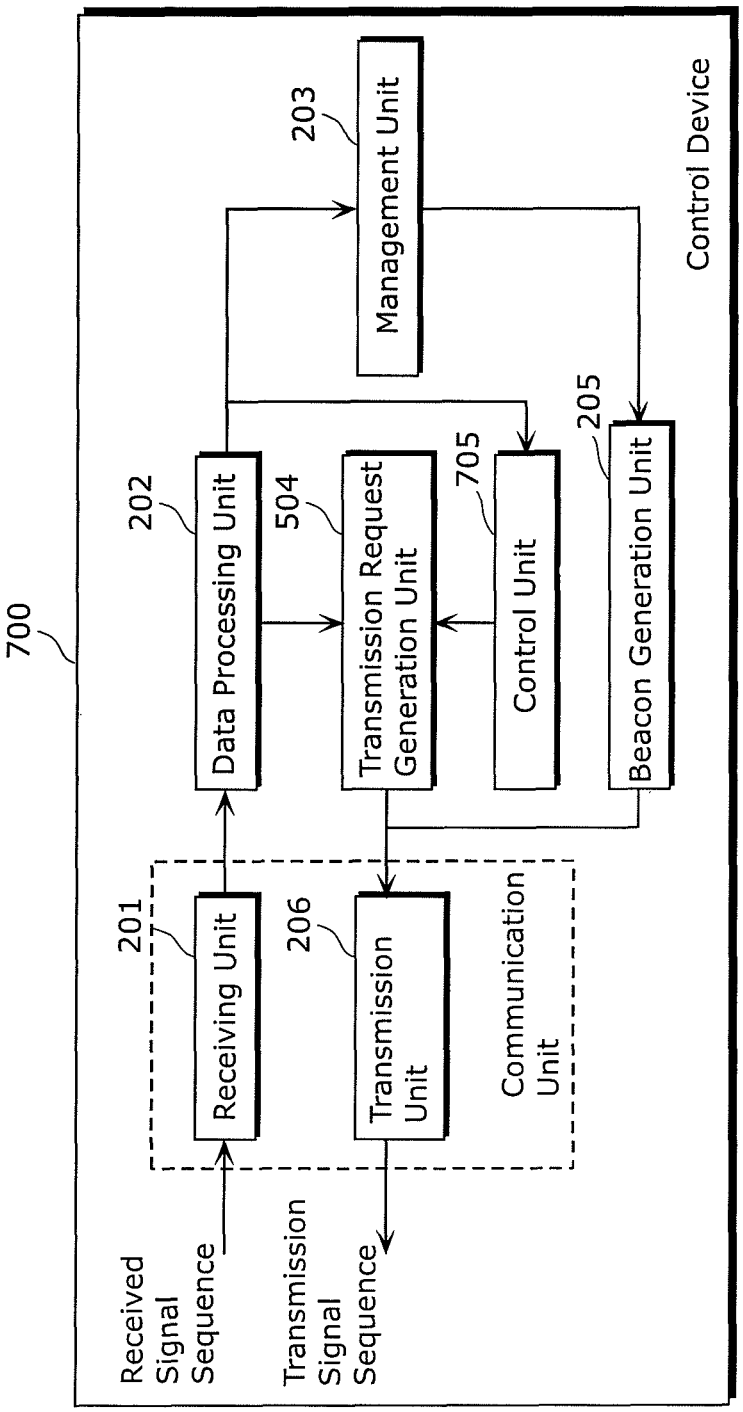
FIG. 17 is a functional block diagram of a control device according to Embodiment 4 of the present invention.

FIG. 17 is a functional block diagram of the control device 700 according to Embodiment 4.

The same reference numerals in FIG. 12 are assigned to the identical structural elements in FIG. 17, so that these identical structural elements are not described again below.

The control device 700 shown in FIG. 17 differs from the control device 500 shown in FIG. 12 in further including a control unit 705.

The control unit 705 determines an order of selecting frequency channels to transmit an acknowledgement packet transmission request, based on the address information of the captured already-connected terminals which is notified from the communication terminal 600.

Figure 18B:
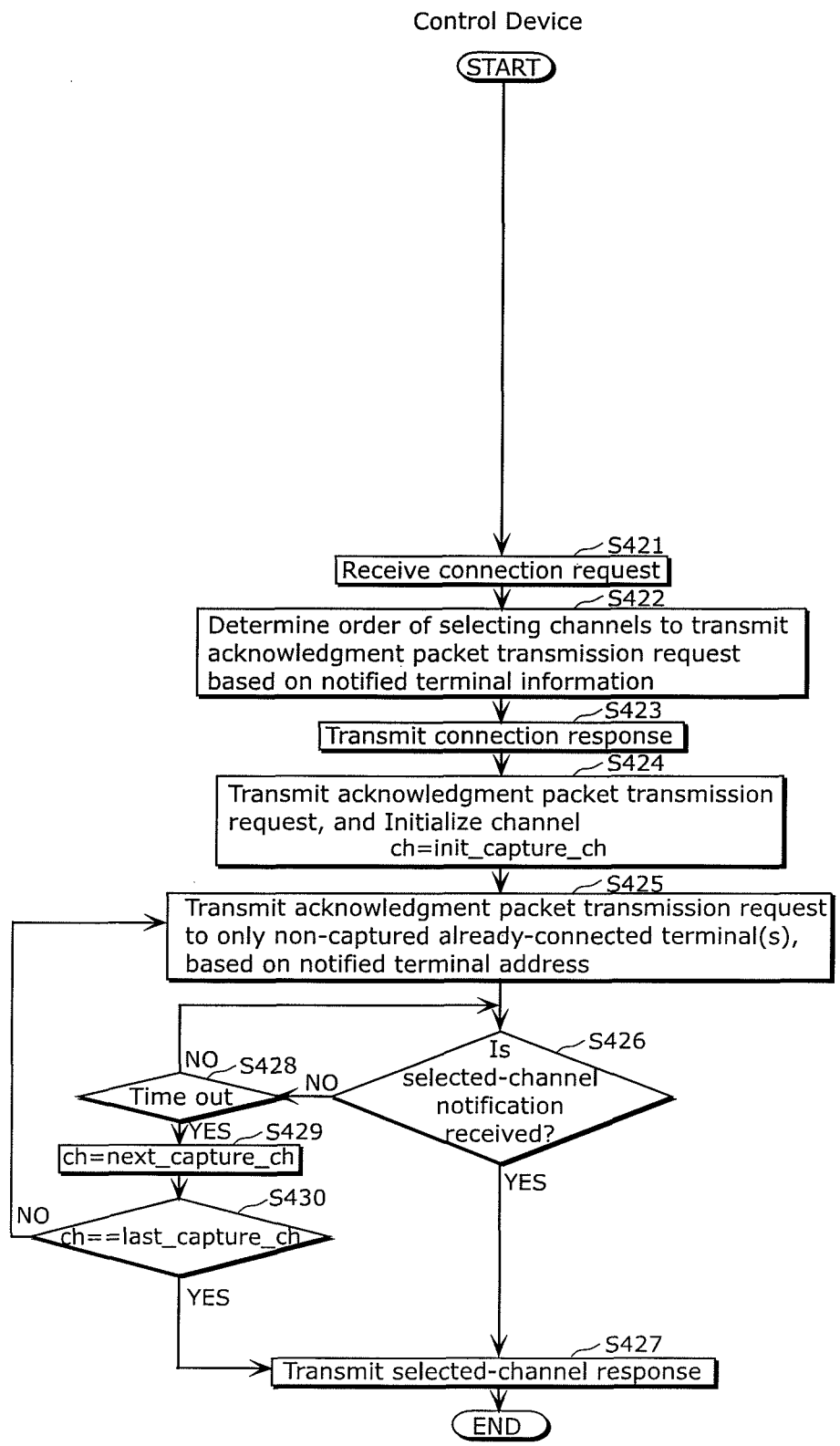
FIG. 18B is a flowchart of processing performed by a control device according to Embodiment 4 of the present invention.
Figure 18C:
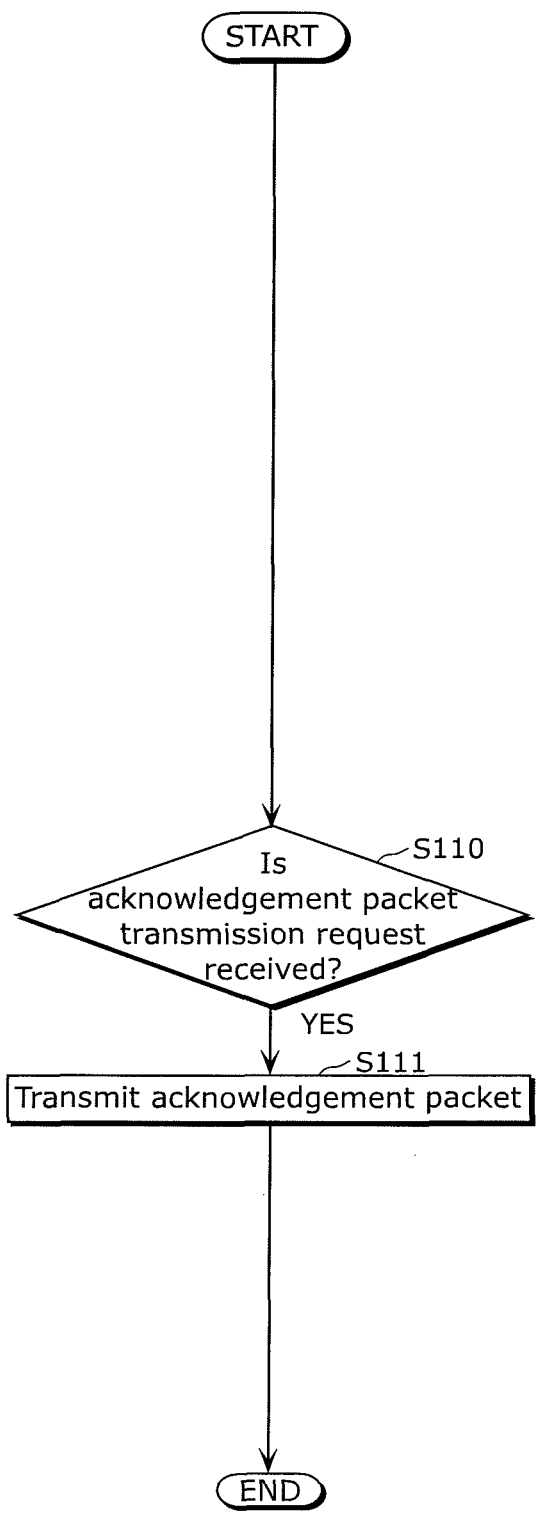
FIG. 18C is a flowchart of processing performed by an already-connected terminal according to Embodiment 4 of the present invention.

Next, the description is given for the processing performed by the terminal 600A as a newly-connecting terminal, the processing performed by the control device 700, and the processing performed by the already-connected terminals 600B to 600F according to Embodiment 4 with reference to FIGS. 18A to 18C, respectively.

FIGS. 18A to 18C are flowcharts of the processing of the newly-connecting terminal 600A, the processing of the control device 700, and the processing of the already-connected terminals 600B to 600F according to Embodiment 4, respectively.

First, referring to FIG. 18A, the processing performed by the terminal 600A is described.

First, the terminal 600A which is to be newly connected to the control device 700 initializes, to init_scan_ch, a value of a frequency channel ch on which a beacon signal is to be scanned (S401).

Next, the terminal 600A performs scanning to receive a beacon signal from the control device 700, thereby receiving the beacon signal (S402).

Next, from the beacon signal received at S402, the terminal 600A obtains information Nch indicating the number of already-connected terminals currently connected to the control device 700 (S403).

Furthermore, the terminal 600A captures signals from the already-connected terminals during scanning the beacon signal from the control device 700, and records the number Sch of already-connected terminals captured in the scanning and addresses of the already-connected terminals (S404).

Next, the terminal 600A sets a value of ch to next_scan_ch to switch the frequency channel ch for scanning a beacon signal to another (S405).

Next, the terminal 600A determines whether or not the value of ch is last_scan_ch (S406). If it is determined that the value of ch is not yet last_scan_ch (NO at S406), the terminal 600A performs beacon scanning via a next frequency channel ch (S402).

On the other hand, if it is determined that the value of ch is last_scan_ch (YES at S406), then the terminal 600A determines that the beacon scanning is completed and transmits, to the control device 700, a connection request for requesting network connection (S407).

Furthermore, the terminal 600A notifies the control device 700 of the addresses of the captured already-connected terminals on each of the frequency channels which are recorded at S404 (S408). This notification may be included in the connection request at S407, or may be transmitted as a different signal.

Next, from the control device 700, the terminal 600A receives a connection response for permitting connection, thereby completing the connection (S409).

Next, the terminal 600A initializes, to init_capture_ch, a value of frequency channel ch on which the already-connected terminals connected to the control device 700 are captured (S410).

Next, the terminal 600A captures acknowledgement packets transmitted from the already-connected terminals (S411).

Next, the terminal 600A obtains the number Cch of already-connected terminals by the capturing (S412).

Next, by subtracting (a) the number Cch of already-connected terminals which is obtained in the already-connected terminal capturing and (b) the number Sch of already-connected terminals captured in the beacon scanning, from the number Nch of already-connected terminals which is obtained by the beacon signal, the terminal 600A detects the number Hch of hidden terminals from which signals do not arrive at the terminal 600A (S413).

Next, the terminal 600A determines whether or not the number Hch of hidden terminals is 0 (S414). If it is determined that the number Hch of hidden terminals is 0 (YES at S414), then the terminal 600A selects the currently using frequency channel ch as a frequency channel to be used for communication (S415). Then, the terminal 600A causes the transmission unit 105 to transmit a selected-channel notification to the control device 700 to notify the frequency channel selected at S415 (S420).

On the other hand, if it is determined that the number Hch of hidden terminals is not 0 (NO at S414), then the terminal 600A determines that there is an already-connected terminal not yet detected by the terminal 600A, and further determines whether or not a time period required for capturing already-connected terminals is timed out on the frequency channel ch (S416). On the other hand, if it is determined that the time period for capturing already-connected terminals remains (No at S416), then the terminal 600A proceeds to S411.

On the other hand, if it is determined that the time period for capturing already-connected terminals is timed out (YES at S416), then the terminal 600A sets the value of ch to next_capture_ch to switch the frequency channel ch on which already-connected terminals are captured (S417).

Next, the terminal 600A determines whether or not the value of ch is last_capture_ch (S418). If it is determined that the value of ch is not yet last_capture_ch (NO at S418), then the terminal 600A captures already-connected terminals via a next frequency channel ch (S411).

On the other hand, if it is determined that the value of ch is last_capture_ch (YES at S418), then the terminal 600A determines that the capturing of already-connected terminals is completed and selects a frequency channel ch having a minimum number Hch of hidden terminals as a frequency channel ch to be used for communication (S419).

Next, with reference to FIG. 18B, the processing performed by the control device 700 is described.

First, the control device 700 receives a connection request transmitted from the terminal 600A (S421).

Next, based on the number of captured already-connected terminals for each of the frequency channels which is notified from the terminal 600A, the control device 700 determines an order of selecting frequency channels to transmit an acknowledgement packet transmission request, so that a frequency channel with a less number of already-connected terminals not yet captured by the 600A is selected earlier (S422).

Next, the control device 700 transmits a connection response to the terminal 600A to permit the connection request (S423).

Next, the control device 700 initializes, to init_capture_ch, a value of the frequency channel ch on which an acknowledgement packet transmission request is to be transmitted (S424).

Next, based on the addresses of the captured already-connected terminals which are notified from the terminal 600A, the control device 700 transmits a transmission request only to an already-connected terminal which the newly-connecting terminal has not yet captured (S425).

Next, the control device 700 determines whether or not the selected-channel notification is received from the terminal 600A (S426). If it is determined that the selected-channel notification is received (YES at S426), then the control device 700 transmits a selected-channel response in response to the selected-channel notification transmitted from the terminal 600A (S427).

On the other hand, if it is determined that the selected-channel notification is not received (NO at S426), then the control device 700 determines whether or not the time period for capturing already-connected terminals by the terminal 600A is timed out (S428). If it is determined that the time period for capturing already-connected terminals remains (NO at S428), then the control device 700 continues monitoring of a selected-channel notification (S426).

On the other hand, if it is determined that the time period for capturing already-connected terminals is timed out (YES at S428), then the control device 700 sets the value of ch to next_capture_ch to switch the frequency channel ch on which an acknowledgement packet transmission request is transmitted (S429).

Next, the control device 700 determines whether or not the value of ch is last_capture_ch (S430). If it is determined that the value of ch is not yet last_capture_ch (NO at S430), then the control device 700 transmits an acknowledgement packet transmission request via a next frequency channel ch (S425).

On the other hand, if it is determined that the value of ch is last_capture_ch (YES at S430), then the control device 700 determines that the capturing of already-connected terminals is completed and proceeds to S427.

The processing regarding already-connected terminals which is shown in FIG. 18C is the same as the processing in FIG. 4C, so that it is not described again.

Figure 19:
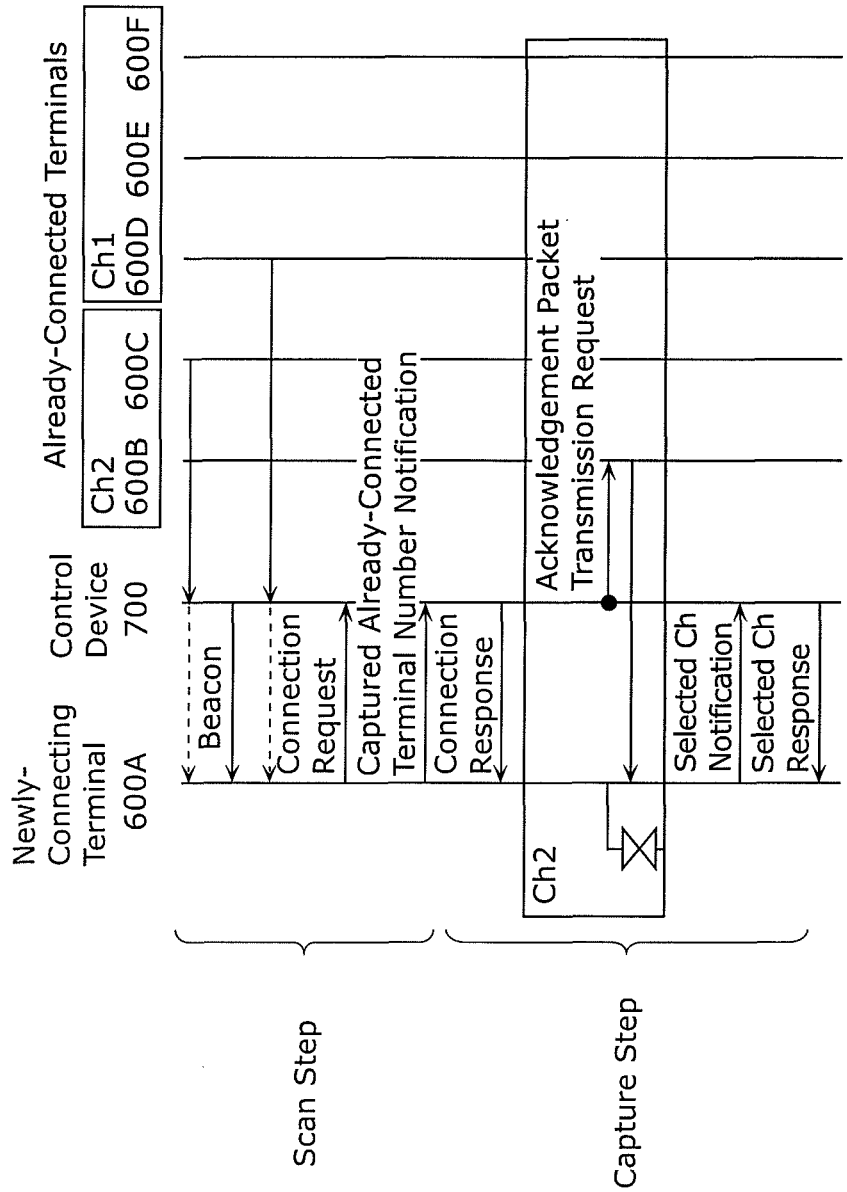
FIG. 19 is a diagram showing an example of a connection sequence according to Embodiment 4 of the present invention.

FIG. 19 shows an example of a connection sequence when the terminal 600A attempts to be connected to the control device 700 according to Embodiment 4. In FIG. 19, the connection sequence according to the present embodiment includes a scan step and a capture step.

First, at the scan step, the terminal 600A scans a beacon signal transmitted from the control device 700 at certain time intervals. At the same time as the beacon scanning, the terminal 600A also captures signals from the already-connected terminals.

After scanning a beacon signal transmitted from the control device 700, the terminal 600A transmits, to the control device 700, a connection request and an address notification of the already-connected terminals captured in the beacon scanning.

In FIG. 19, from the already-connected terminal information included in the beacon signal, the terminal 600A is notified of that there are three already-connected terminals on Ch1 and two already-connected terminals on Ch2.

Since signals have been received from the terminals 600C and 600D, addresses of the terminals 600C and 600D are transmitted to the control device 700.

On the other hand, in receiving the connection request, the control device 700 transmits, to the terminal 600A, a connection response for permitting connection.

Furthermore, based on the number of captured already-connected terminals for each of the frequency channels which is notified from the terminal 600A, the control device 700 determines an order of selecting frequency channels to transmit an acknowledgement packet transmission request, so that a frequency channel with a less number of already-connected terminals not yet captured by the 600A is selected earlier.

In FIG. 19, since the terminal 600A has already captured one already-connected terminal (600D) on the frequency channel Ch1 and one already-connected terminal (600C) on the frequency channel Ch2. Therefore, the number of already-connected terminals which have not yet been captured is two on Ch1 and one on Ch1. Therefore, the control device 700 switches frequency channels in order of Ch2 and then Ch1, in order to transmit an acknowledgement packet transmission request.

Next, at the capture step, hidden terminals are detected, and a frequency channel by which influence of hidden terminal problem can be reduced is selected.

After being connected to the terminal 600A, the control device 700 transmits an acknowledgement packet transmission request to each of the already-connected terminals connected to Ch2.

In FIG. 19, since the terminal 600A has already captured the terminal 600C, the control device 700 transmits an acknowledgement packet transmission request only to the already-connected terminal 600B. In receiving the acknowledgement packet transmission request, the already-connected terminal 600B transmits an acknowledgement packet.

The terminal 600A captures the acknowledgement packet transmitted from the already-connected terminal via Ch2. In FIG. 19, the terminal 600A can capture an acknowledgement packet transmitted from the terminal 600B via Ch2. In other words, the terminal 600A can detect two already-connected terminals on Ch2.

Next, based on the number of already-connected terminals which is included in the beacon signal and the information obtained by the already-connected terminal capturing, the terminal 600A determines that all of the already-connected terminals on Ch2 have been captured, and then selects Ch2 as a frequency channel to be used for communication.

The terminal 600A transmits, to the control device 700, a selected-channel notification for notifying that Ch2 is selected as a frequency channel to be used for communication. The control device 700 transmits a selected-channel response to the terminal 600A in response to the selected-channel notification transmitted from the terminal 600A.

As described above, in the channel selection for avoiding hidden terminals according to Embodiment 4, the newly-connecting terminal captures also signals transmitted from the already-connected terminals in the beacon scanning, and notifies the control device of the addresses of the captured already-connected terminals. Therefore, it is possible to transmit an acknowledgement packet transmission request only to an already-connected terminal which the newly-connecting terminal cannot scan. As a result, traffic caused by the acknowledgement packet exchange is reduced, and therefore a time period for capturing already-connected terminals can be shortened.

For example, in FIG. 19, it is necessary to transmit an acknowledgement packet transmission request only to the terminal 600B. Therefore, in comparison to FIG. 14, it is possible to reduce the traffic required for the acknowledgement packet exchange to a half.

(Embodiment 5)

A communication terminal according to Embodiment 5 further includes a request signal generation unit. The request signal generation unit causes the communication unit to transmit a request signal while a using frequency channel is sequentially switched to another. The request signal is for requesting each of the other communication terminals performing wireless communication via the using frequency channel to transmit an acknowledgement signal.

Figure 20:
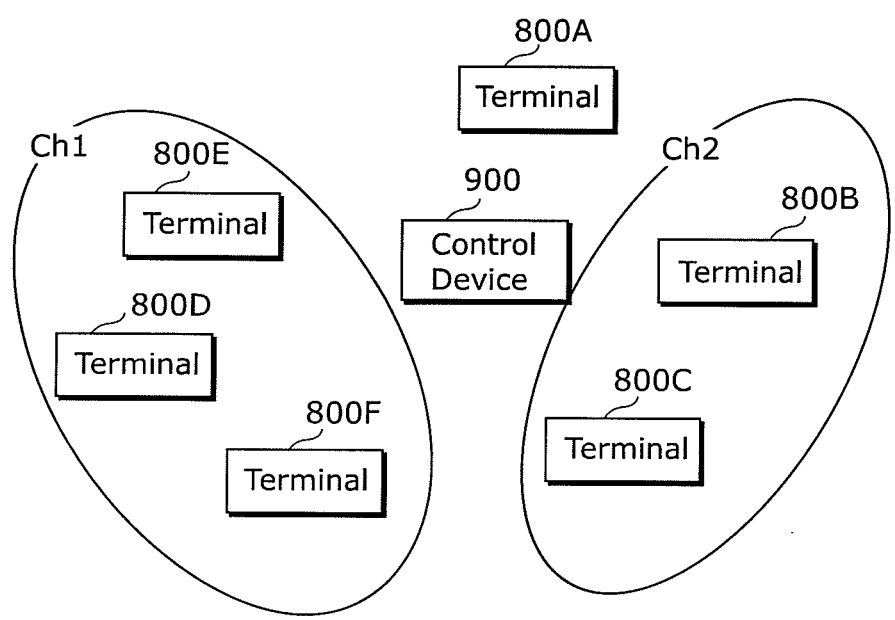
FIG. 20 is a configuration example of a wireless communication system according to Embodiment 5 of the present invention.

FIG. 20 is a configuration example of a wireless communication system according to Embodiment 5.

The wireless communication system shown in FIG. 20 includes: a control device 900 that controls a wireless network; and terminals 800A to 800F that wirelessly communicate with the control device 900 under the control of the control device 900. Here, the structure of each of the terminals 800A to 800F is the same as that of the communication terminal 800 shown in FIG. 20.

A communication terminal according to Embodiment 5 further includes a signal generation unit. The signal generation unit generates a request signal and causes the communication unit to transmit the request signal while a using frequency channel is sequentially switched to another. The request signal is for requesting each of the other communication terminals performing wireless communication via the using frequency channel to transmit an acknowledgement signal.

Figure 21:
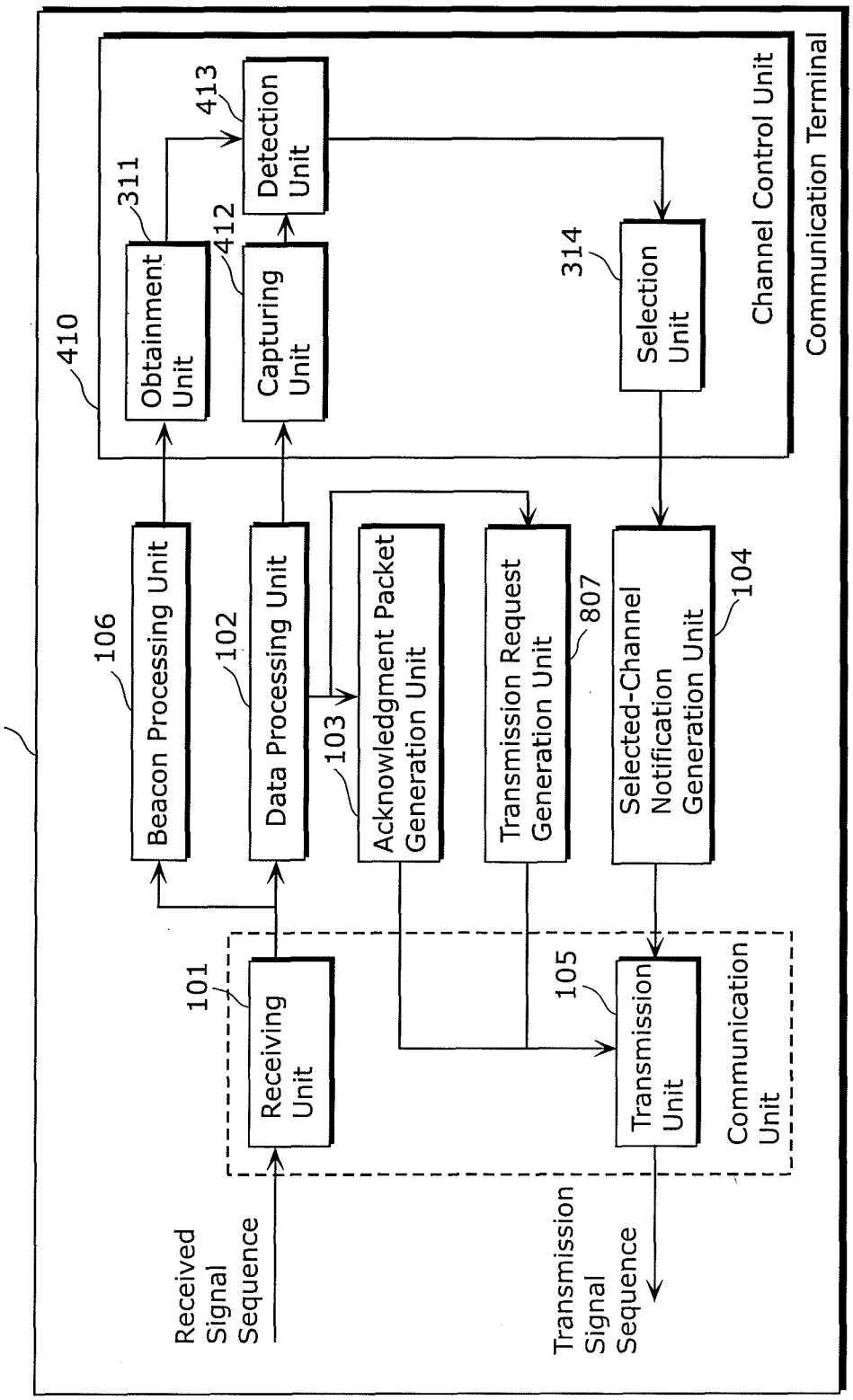
FIG. 21 is a functional block diagram of a communication terminal according to Embodiment 5 of the present invention.

FIG. 21 is a functional block diagram of a representative communication terminal 800 according to Embodiment 5.

The same reference numerals in FIG. 11 are assigned to the identical structural elements in FIG. 21, so that these identical structural elements are not described again below.

The communication terminal 800 shown in FIG. 21 differs from the communication terminal 400 shown in FIG. 11 in further comprising a transmission request generation unit (signal generation unit) 807. The transmission request generation unit 807 generates a request signal for requesting the other communication terminals to transmit acknowledgement signals, causes the transmission unit 105 to transmit the generated request signal.

Figure 22:
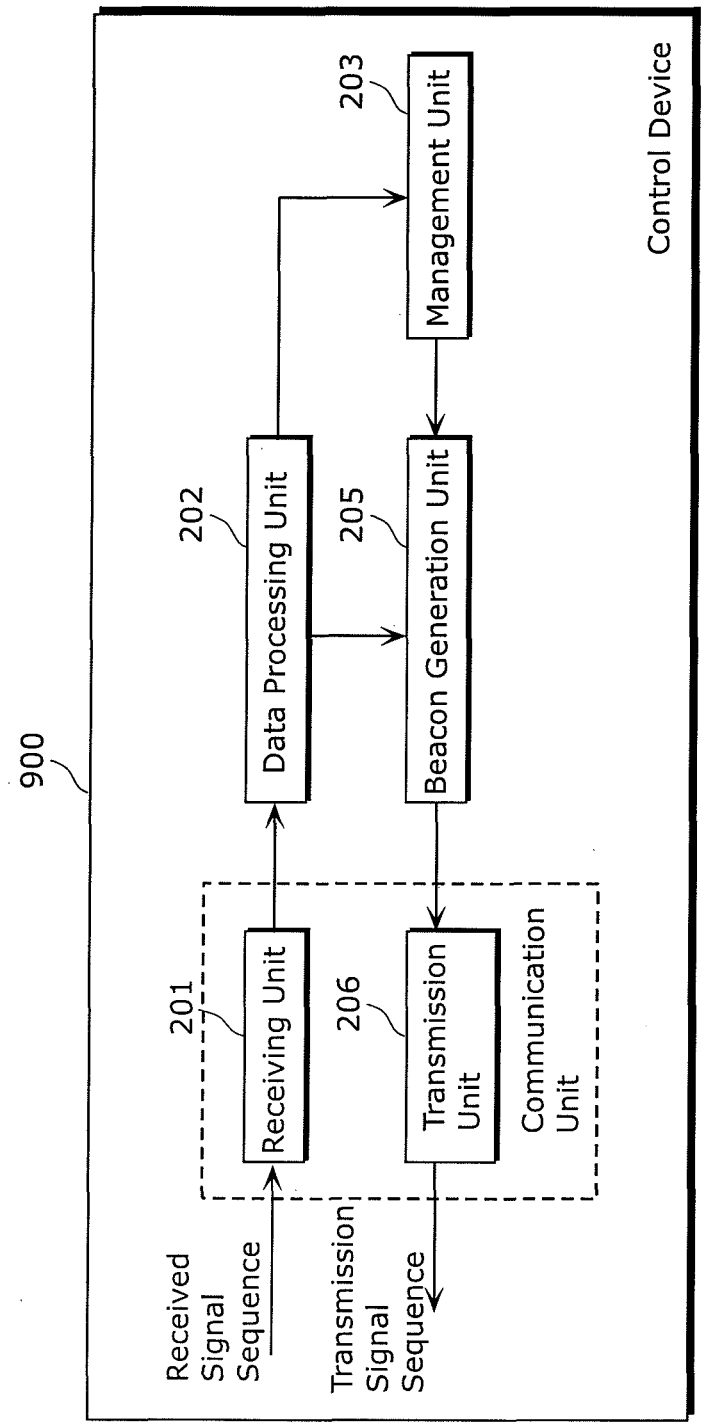
FIG. 22 is a functional block diagram of a control device according to Embodiment 5 of the present invention.

FIG. 22 is a functional block diagram of the control device 900 according to Embodiment 5.

The same reference numerals in FIG. 3 are assigned to the identical structural elements in FIG. 22, so that these identical structural elements are not described again below.

The control device 900 shown in FIG. 22 differs from the control device 200 shown in FIG. 3 in that the transmission request generation unit 204 is not included.

Figure 23A:
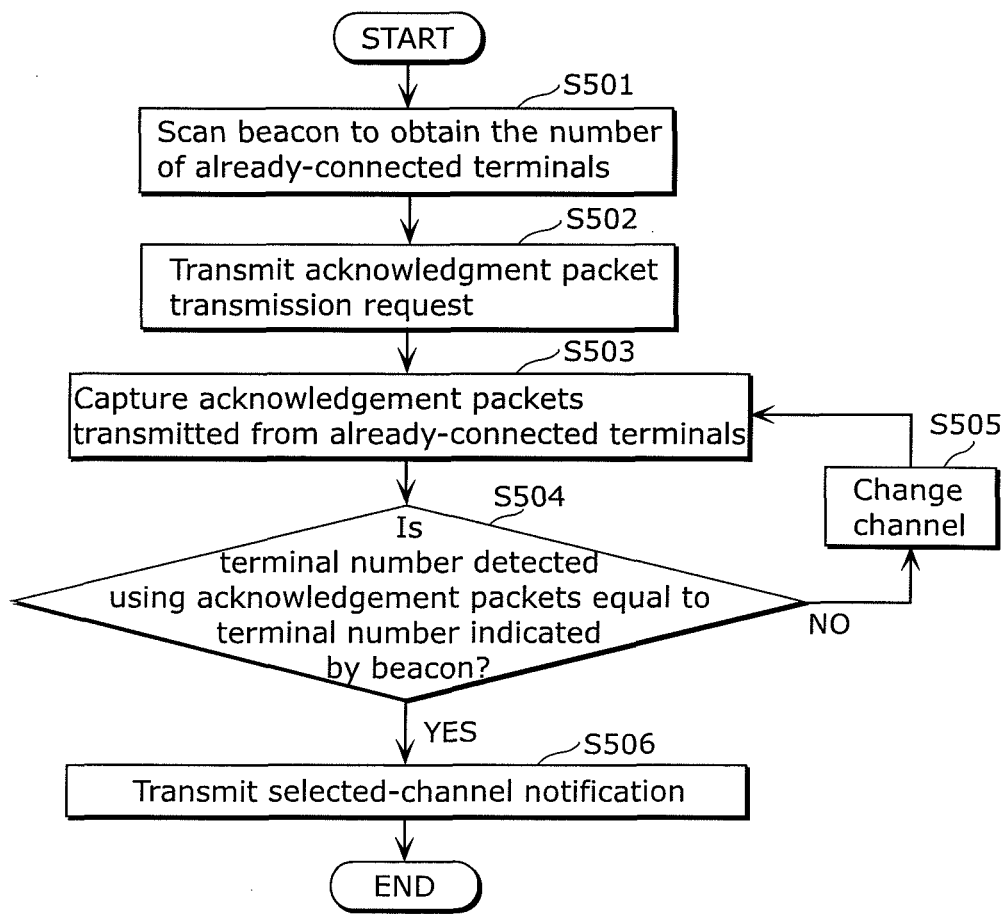
FIG. 23A is a flowchart of processing performed by a newly-connecting terminal according to Embodiment 5 of the present invention.
Figure 23B:
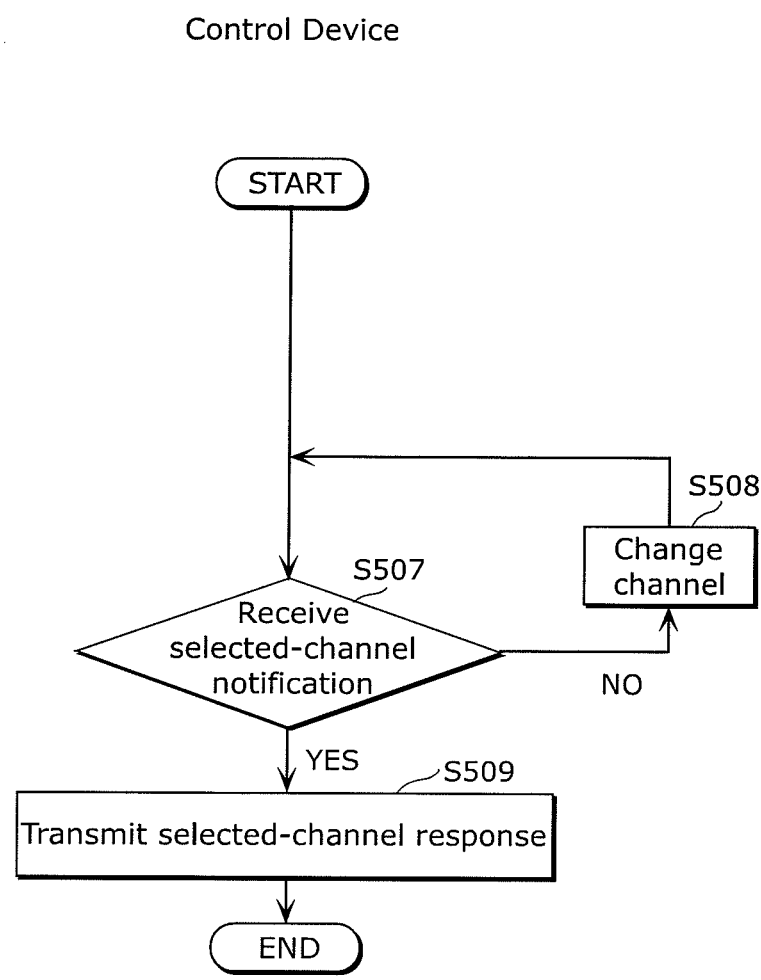
FIG. 23B is a flowchart of processing performed by a control device according to Embodiment 5 of the present invention.
Figure 23C:
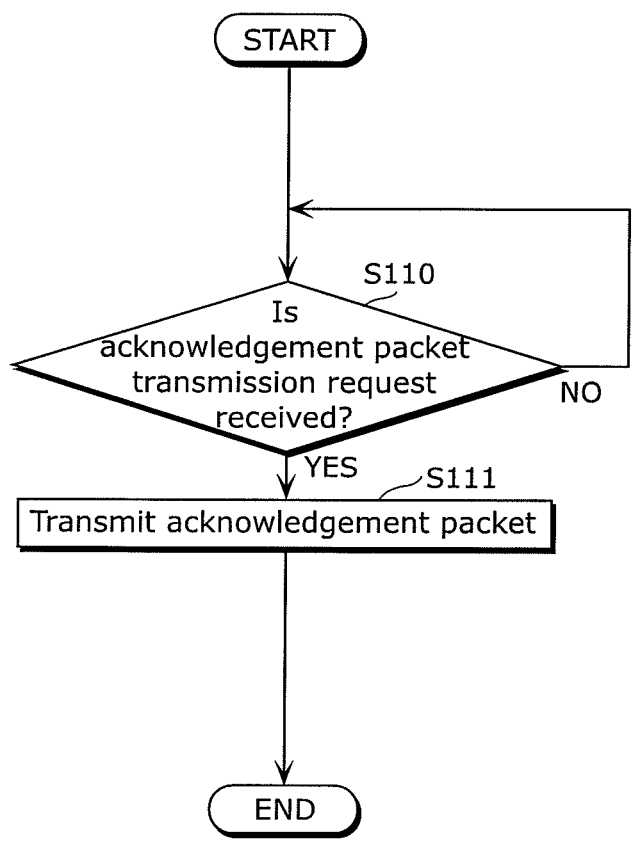
FIG. 23C is a flowchart of processing performed by an already-connected terminal according to Embodiment 5 of the present invention.

Next, the description is given for the processing performed by the terminal 800A as a newly-connecting terminal, the processing performed by the control device 900, and the processing performed by the already-connected terminals 800B to 800F according to Embodiment 5 with reference to FIGS. 23A to 23C, respectively.

FIGS. 23A to 23C are flowcharts of the processing of the newly-connecting terminal 800A, the processing of the control device 900, and the processing of the already-connected terminals 800B to 800F according to Embodiment 5, respectively.

First, referring to FIG. 23A, the processing performed by the terminal 800A is described.

At the beginning, the terminal 800A, which is to be newly connected to the control device 900, performs scanning to receive a beacon signal from the control device 900, and obtains, from the received beacon signal, the number of already-connected terminals currently connected to the control device 900 (S501).

Next, the terminal 800A transmits an acknowledgement packet transmission signal to the already-connected terminals (S502).

Next, the terminal 800A captures the acknowledgement packets transmitted from the already-connected terminals, and detects the number of already-connected terminals based on the number of the captured acknowledgement packets (S503).

Next, the terminal 800A compares the number of already-connected terminals which is added to the beacon signal to the number of already-connected terminals which is detected based on the acknowledgement packets, and thereby determines existence of hidden terminal (S504).

If it is determined that the already-connected terminal numbers are equal, in other words, there is no hidden terminal (YES at S504), then the terminal 800A determines that communication uses the frequency channel, and transmits, to the control device 900, a selected-channel notification for notifying the selected frequency channel (S506).

On the other hand, if it is determined that the already-connected terminal numbers are different (NO at S504), then the terminal 800A determines that there is a hidden terminal, and therefore switches the frequency channel to another (S505).

Next, with reference to FIG. 23B, the processing performed by the control device 900 is described.

First, the control device 900 determines whether or not a selected-channel notification is received (S507). If it is determined that the selected-channel notification is received (YES at S507), then the control device 900 transmits a selected-channel response in response to the selected-channel notification (S509). On the other hand, if it is determined that the selected-channel notification is not received (NO at S507), then the control device 500 switches the using frequency channel to another (S508).

The processing regarding already-connected terminals which is shown in FIG. 23C is the same as the processing in FIG. 4C, so that it is not described again.

FIG. 24 shows an example of a connection sequence when the terminal 800A attempts to be connected to the control device 900 according to Embodiment 5. In FIG. 24, the connection sequence according to the present embodiment includes a scan step and a capture step.

First, at the scan step, the terminal 800A scans a beacon signal transmitted from the control device 900 at certain time intervals. After scans a beacon signal transmitted from the control device 900, the terminal 800A transmits a connection request to the control device 900.

On the other hand, in receiving the connection request, the control device 900 transmits, to the terminal 800A, a connection response for permitting connection.

Next, at the capture step, hidden terminals are detected, and a frequency channel by which influence of hidden terminal problem can be reduced is selected.

After being connected to the control device 900, the terminal 800A broadcasts an acknowledgement packet transmission request via Ch1.

In receiving the acknowledgement packet transmission request, each of the already-connected terminals on Ch1 transmits an acknowledgement packet. In FIG. 24, the transmission request transmitted from the terminal 800A arrives at the terminal 800D and 800E, but not the terminal 800F. Therefore, only the terminals 800D and 800E transmit their acknowledgement packets.

Here, the terminal 800A captures the acknowledgement packets transmitted from the already-connected terminals via Ch1. In FIG. 24, the terminal 800A captures packets transmitted from the two already-connected terminals connected on Ch1.

Therefore, the information indicating the number of already-connected terminals which is included in the beacon signal indicates three terminals, while the information indicating the number of already-connected terminals which is obtained by capturing the packets transmitted from the already-connected terminals indicates two terminals. As a result, the terminal 800A determines that there is one hidden terminal on Ch1, and therefore proceeds to a next frequency channel (Ch2).

In the same manner as described for Ch1, the terminal 800A broadcasts an acknowledgement packet transmission request via Ch2.

In receiving the acknowledgement packet transmission request, each of the already-connected terminals on Ch2 transmits an acknowledgement packet. In FIG. 24, the transmission request transmitted from the terminal 800A arrives at the terminals 800B and 800C. Therefore, only the terminals 800D and 800E transmit their acknowledgement packets.

Here, the terminal 800A captures the acknowledgement packets transmitted from the already-connected terminals via Ch2. In FIG. 24, the terminal 800A captures packets transmitted from the two already-connected terminals connected on Ch2.

Therefore, the information indicating the number of already-connected terminals which is included in the beacon signal indicates two terminals, while the information indicating the number of already-connected terminals which is obtained by capturing the packets transmitted from the already-connected terminals indicates two terminals. As a result, the terminal 800A determines that there is no hidden terminal on Ch2, and therefore selects Ch2 as a frequency channel to be used for communication.

The terminal 800A transmits, to the control device 900, the selected-channel notification indicating that Ch2 is selected as a frequency channel to be used for communication.

The control device 900 transmits a selected-channel response to the terminal 800A in response to the selected-channel notification transmitted from the terminal 800A.

As described above, in the channel selection for avoiding hidden terminals according to Embodiment 5, the newly-connecting terminal transmits an acknowledgement packet transmission request so that the acknowledgement packet transmission request does not arrive at hidden terminals. As a result, the number of terminals transmitting acknowledgement packets is reduced. It is therefore possible to reduce a traffic for the packet exchange and reduce collision of acknowledgement packets transmitted from a plurality of already-connected terminals.

As described above, in the channel selection for avoiding hidden terminals according to Embodiment 5, the control device does not transmit an acknowledgement packet, and the newly-connecting terminal includes the transmission request generation unit that generates an acknowledgement packet transmission request. As a result, the control device can be implemented without a significant change from the existing structure.

Figure 25:
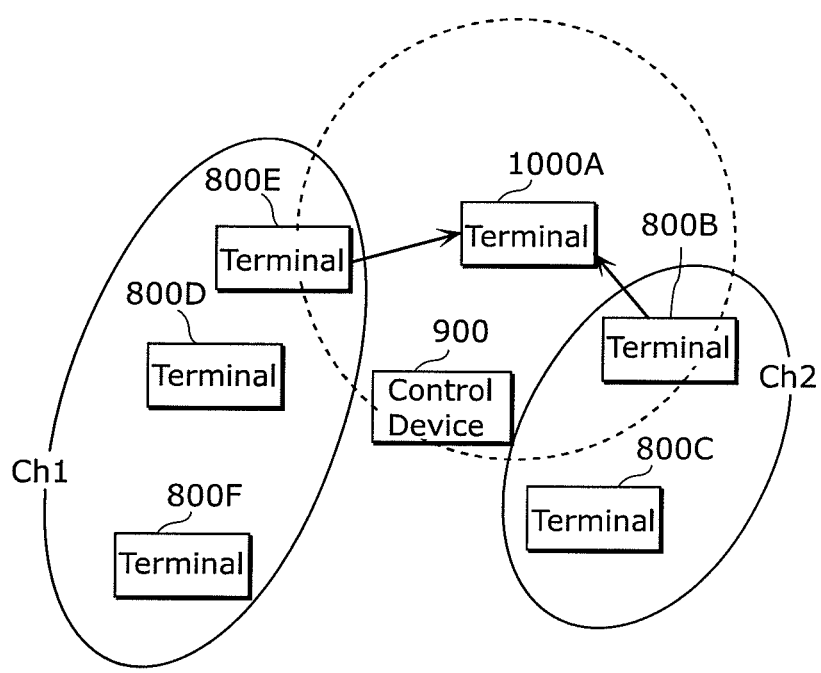
FIG. 25 is a diagram showing an example of the case where power of transmitting an acknowledgement packet is controlled, according to Embodiment 5 of the present invention.

FIG. 25 shows the situation where transmission power used by a terminal 1000A as a newly-connecting terminal to transmit an acknowledgement packet transmission request is limited enough to arrive at the control device 900.

The terminal 1000A differs from the communication terminal 800 in FIG. 21 in the function of the detection unit 413. The detection unit in the terminal 1000A has not only the functions of the detection unit 413 in the communication terminal 800 but also a function of calculating a ratio of (a) the number of captured already-connected terminals which is detected by acknowledgement packets to (b) the number of already-connected terminals which is included in a beacon signal.

In FIG. 25, by controlling the transmission power for the acknowledgement packet transmission request, acknowledgement packets are transmitted only from the terminals 800B and 800E.

Here, the terminal 1000A calculates, for each of the frequency channels, a ratio of (a) the number of captured already-connected terminals which is detected by acknowledgement packets to (b) the number of already-connected terminals which is included in a beacon signal. The terminal 1000A selects a frequency channel having a high ratio of the number of captured already-connected terminals.

Therefore, traffic for the acknowledgement packet transmission request and the acknowledgement packets is reduced, so as to shorten a time period for capturing.

Here, if the control device 900 knows a network topology such as positional relationships among the terminals 1000A and 800B to 800F, it is possible to determine an already-connected terminal having a high possibility of being a hidden terminal for the newly-connecting terminal 1000A. Therefore, it is also possible to transmit an acknowledgement packet transmission request to already-connected terminals in order of increasing a possibility of being a hidden terminal.

Figure 26:
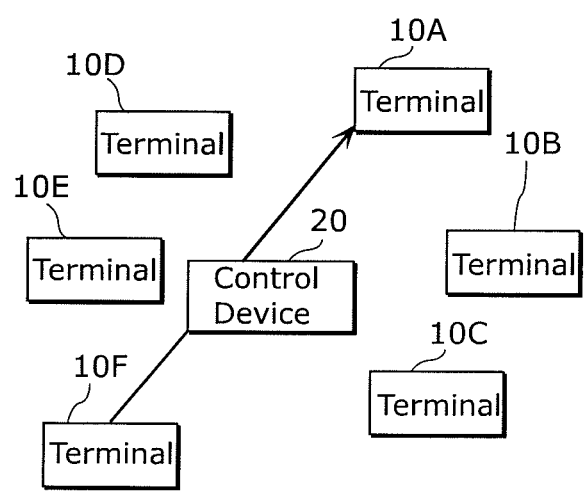
FIG. 26 is a configuration example of a wireless communication system having a high possibility of hidden terminal problem, according to Embodiment 5 of the present invention.

For example, an example where, in the case of network topology as shown in FIG. 26, the terminal 10A attempts to be newly connected to the control device 20 is shown.

Here, when the terminal 10A communicates with the control device 20, the terminal 10F has a highest possibility of being a hidden terminal. More specifically, since the terminal 10F exists on a line extended from a straight line between the terminal 10A and the control device 20, the terminal 10F is likely to be a hidden terminal for the terminal 10A.

Therefore, the terminal 10A needs to receive an acknowledge packet from only the terminal 10F. If the terminal 10A can detect arrival of the acknowledgement packet from the terminal 10F, it can also detect that the other terminals cannot be hidden terminals at the same time.

Therefore, by requesting only an already-connected terminal having a high possibility of being a hidden terminal to transmit an acknowledgement packet, it is possible to significantly reduce traffic for acknowledgement packet exchange.

Even if the control device 900 does not detect the network topology, it is possible to expect the situation of the other terminals. For example, in a home network as shown in FIG. 7, as long as it is certain in which room each of terminals is placed, only a single representative terminal in each room transmits an acknowledgement packet. Thereby, the situation of the other terminals in the room can be predicted. As a result, it is possible to select a frequency channel having a low possibility of including a hidden terminal. In addition, it is possible to shorten a time period for capturing already-connected terminals.

Figure 27:
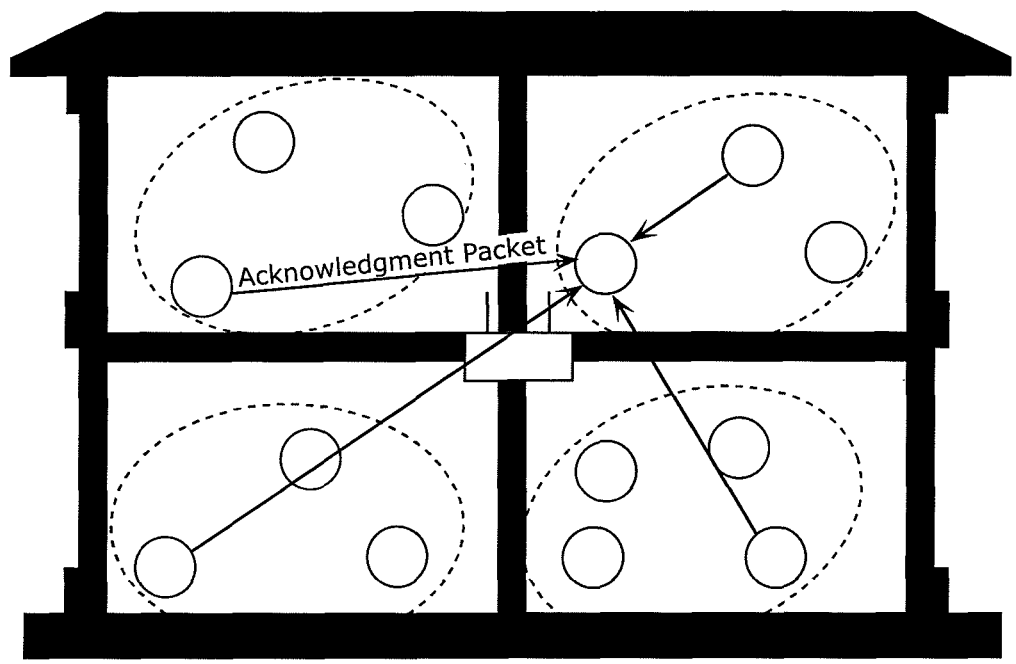
FIG. 27 is an example of a wireless communication system in the case where each room in home has a terminal, according to Embodiment 5 of the present invention.
Figure 28:
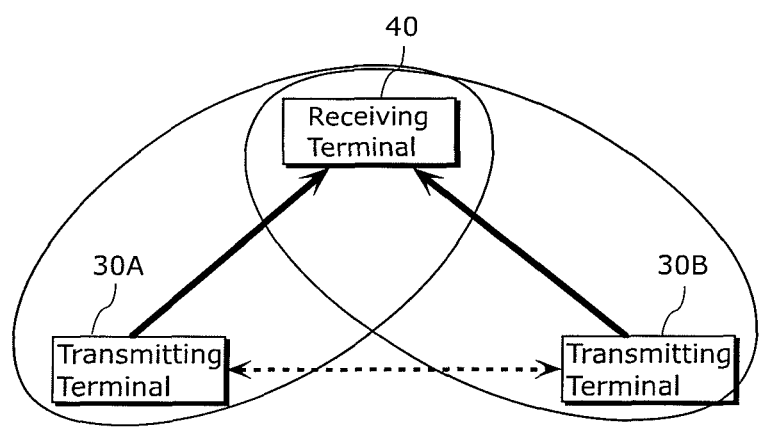
FIG. 28 is an example of a system configuration with hidden terminal problem.
Figure 29:
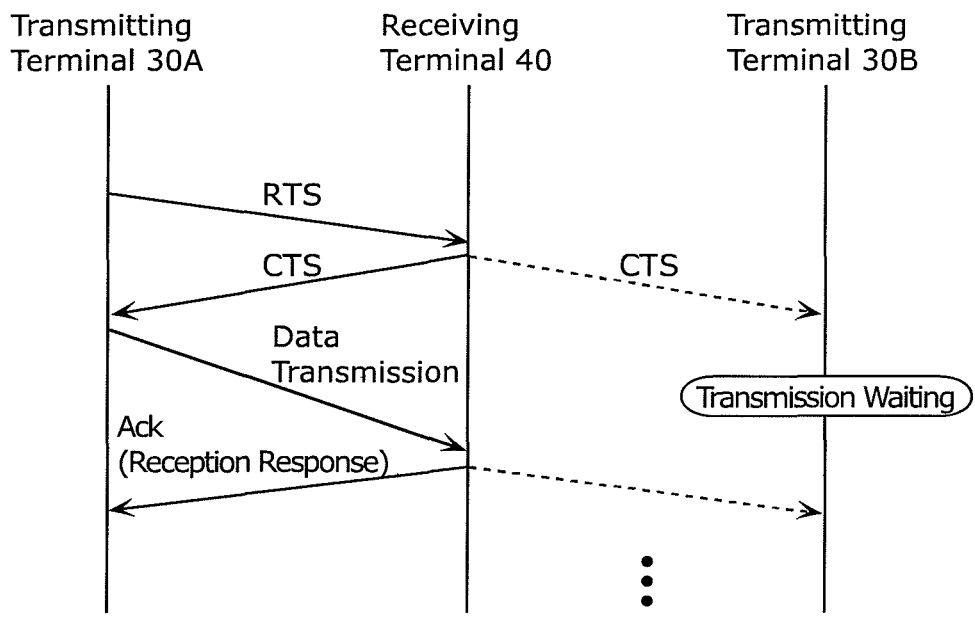
FIG. 29 is an example of hidden terminal problem in the case of using RTS/CTS disclosed in Non-Patent Literature 1.
Figure 30:
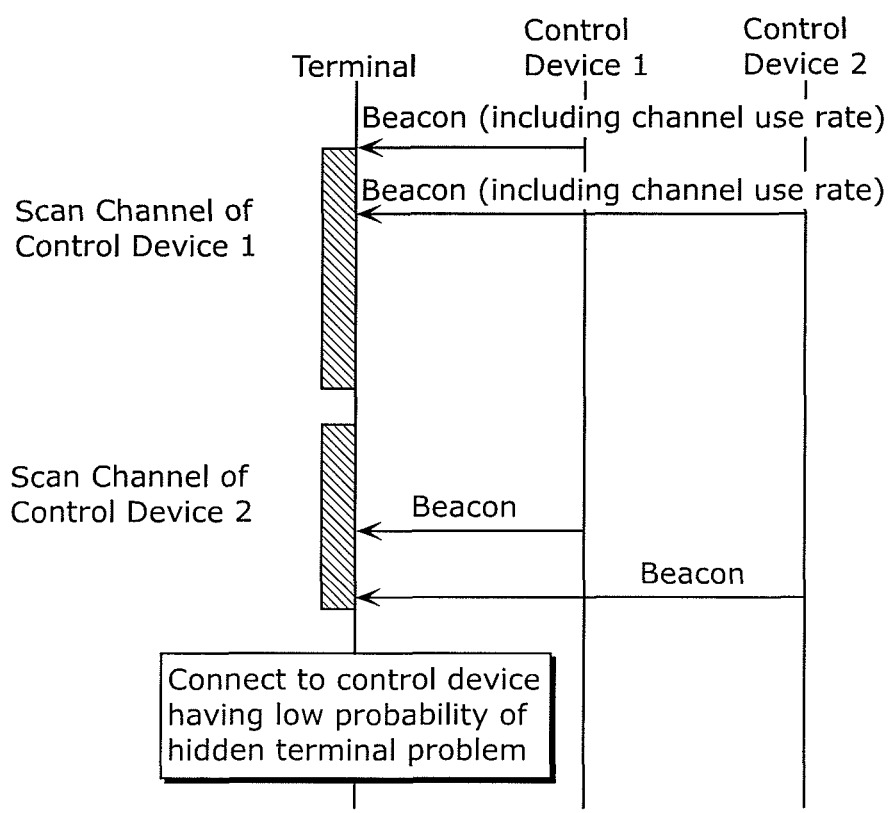
FIG. 30 is an example of selecting a control device in addressing hidden terminal problem disclosed in Non-Patent Literature 1.

In wireless communication by radio, a propagation loss through a wall is much greater than a propagation loss in the air. Therefore, each of terminals in a room partitioned by walls as shown in FIG. 27 is correlated with the propagation status of a newly-connecting terminal. Therefore, an acknowledgement packet transmission request is to be transmitted to only one already-connected terminal in each room.

Furthermore, in consideration of the above-described correlation of propagation status for each room, if a frequency channel without a hidden terminal is selected as described in the present embodiment, the same frequency channel is often selected for terminals in the same room partitioned by walls or the like as shown in FIG. 27.

It is therefore possible to easily perform the control for each of rooms in a home network.

For example, since a frequency channel is selected for each room, when a home appliance having a wireless communication device is connected in a network, it is possible to automatically register in which room the home appliance is placed. Moreover, since rooms use different frequency channels, it is easily multicast a signal to only a specific room when only home appliances in the specific room are to be operated at the same time.

It should be noted that each of the above-described Embodiments 1 to 5 has been described for the case of a wireless communication network, but the present invention is not limited to the above. For example, it may be another network using a plurality of frequency channels, such as Power Line Communications (PLC).

It is also possible that the structures of Embodiments 1 to 5 are desirably combined.

It is further possible that the structure of each of the embodiments is implemented into a Large Scale Integration (LSI) that is a typically integrated circuit. These may be integrated separately, or a part or all of them may be integrated into a single chip. The integrated circuit is referred to as a LSI, but the integrated circuit can be called an IC, a system LSI, a super LSI or an ultra LSI depending on their degrees of integration. The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

(Variations)

Although the present invention has been described using the above embodiments, the present invention is, of course, not limited to the above embodiments. The present invention may also be implemented as the followings.

Each of the embodiments may be a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor executes the computer program to cause each of the embodiments to perform its functions. Here, the computer program consists of combinations of instruction codes for issuing instructions to the computer to execute predetermined functions.

It should be noted that a part or all of the structural elements included in each of the embodiments may be implemented into a single Large Scale Integration (LSI). The system LSI is a super multi-function LSI that is a single chip into which a plurality of structural elements are integrated. More specifically, the system LSI is a computer system including a microprocessor, a ROM, a RAM, and the like. The RAM holds a computer program. The microprocessor is executed by the computer program to cause the system LSI to perform its functions.

It should also be noted that a part or all of the structural elements included in each of the embodiments may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor executes the computer program to cause the IC card or the module to perform its functions. The IC card or the module may have tamper resistance.

It should also be noted that the present invention may be the above-described method. The present invention may be a computer program causing a computer to execute the method, or digital signals indicating the computer program.

It should also be noted that the present invention may be a computer-readable recording medium on which the computer program or the digital signals are recorded. Examples of the computer-readable recording medium are a flexible disk, a hard disk, a Compact Disc (CD)-ROM, a magnetooptic disk (MO), a Digital Versatile Disc (DVD), a DVD-ROM, a DVD-RAM, a BD (Blue-ray® Disc), and a semiconductor memory. The present invention may be digital signals recorded on the recording medium.

It should also be noted in the present invention that the computer program or the digital signals may be transmitted via an electric communication line, a wired or wireless communication line, a network represented by the Internet, data broadcasting, and the like.

It should also be noted that the present invention may be a computer system including a microprocessor operating according to the computer program and a memory storing the computer program.

It should also be noted that the program or the digital signals may be recorded onto the recording medium to, be transferred, or may be transmitted via a network or the like, so that the program or the digital signals can be executed by a different independent computer system.

It should also be noted that the above-described embodiments and their variations may be combined.

Although the embodiments according to the present invention have been described with reference to the drawings, the present invention is not limited to the embodiments illustrated in the drawings. The embodiments illustrated in the drawings may be modified and varied within the same meanings and the scope of the present invention.

The wireless communication system according to the present invention is useful for wireless communication or the like of selecting one of frequency channels or one of control devices to be used for the communication.

[Reference Signs List]
1, 2, 20, 200, 500, 700, 900 control device
10A, 10B, 10C, 10D, 10E, 10F, 100A, 100B, 100C, 100D, 100E, 100F, 300A, 300B, 300C, 300D, 300E, 300F, 400A, 400B, 400C, 400D, 400E, 400F, 600A, 600B, 600C, 600D, 600E, 600F, 800A, 800B, 800C, 800D, 800E, 800F, 1000A terminal
30A, 30B transmitting terminal
40 receiving terminal
100, 300, 400, 600, 800 communication terminal
101, 201 receiving unit
102, 202 data processing unit
103 acknowledgment packet generation unit
104 selected-channel notification generation unit
105, 206 transmission unit
106 beacon processing unit
110, 310, 410, 505 channel control unit
203 management unit
204, 504, 807 transmission request generation unit
205 beacon generation unit
311 obtainment unit
312, 412 capturing unit
313, 413 detection unit
314 selection unit
407 terminal number notification generation unit
607 address storage unit
608 generation unit
705 control unit

The invention claimed is:

1. A communication terminal comprising:
a communication unit configured to exchange signals via a frequency channel selected from a plurality of frequency channels;
a first detection unit configured to detect, for each of the frequency channels, a number of one or more other communication terminals performing wireless communication via the each of the frequency channels, by causing the communication unit to receive a notification signal indicating the number from a control device, which is an external device with respect to the communication terminal, while the frequency channels are sequentially switched;
a second detection unit configured to count, for the each of the frequency channels, a number of one or more other communication terminals performing wireless communication via the each of the frequency channels, by causing the communication unit to receive acknowledgement signals transmitted from the one or more other communication terminals while the frequency channels are sequentially switched; and
a channel control unit configured to (i) select, from the frequency channels, a frequency channel having a least difference between the number detected by the first detection unit and the number counted by the second detection unit, and (ii) cause the communication unit to exchange the signals with the control device via the selected frequency channel.

2. The communication terminal according to claim 1, wherein the channel control unit is configured to (i) select, from the frequency channels, a frequency channel having the number detected by the first detection unit which is equal to the number counted by the second detection unit, and (ii) causes the communication unit to exchange the signals with the control device via the selected frequency channel.

3. The communication terminal according to claim 1,
wherein the channel control unit is configured, after the first detection unit detects the number for each of the frequency channels, to cause the communication unit to transmit an order signal to the control device, the order signal being for ordering the control device to transmit a request signal for requesting the one or more other communication terminals to transmit the acknowledgement signals.

4. The communication terminal according to claim 3, further comprising
a third detection unit configured to detect, for each of the frequency channels, a number of the one or more other communication terminals which are one or more source terminals transmitting signals, by causing the communication unit to receive the signals while the first detection unit detects the number for each of the frequency channels,
wherein the channel control unit is configured to cause the communication unit to transmit the order signal to the control device, the order signal being for ordering the control device to transmit the request signal via the respective frequency channels in order of decreasing a difference between the number included in the notification signal and the number of the one or more source terminals.

5. The communication terminal according to claim 3, further comprising
a third detection unit configured to detect, for the each of the frequency channels, information for identifying the one or more other communication terminals which are one or more source terminals transmitting signals, by causing the communication unit to receive the signals while the first detection unit detects the number for each of the frequency channels,
wherein the channel control unit is configured to cause the communication unit to transmit the order signal to the control device, the order signal being for ordering the control device to transmit the request signal to only a communication terminal not detected by the third detection unit.

6. The communication terminal according to claim 1, further comprising
a signal generation unit configured, while the frequency channels are sequentially switched, to (i) generate a request signal for requesting the one or more other communication terminals to transmit the acknowledgement signals, and (ii) cause the communication unit to transmit the request signal.

7. A control device that wirelessly communicates with a communication terminal, the control device being an external device with respect to the communication terminal, the control device comprising:
a communication unit configured to exchange signals via a frequency channel selected from a plurality of frequency channels;
a management unit configured to hold, for each of the frequency channels, information of one or more communication terminals performing wireless communication via the each of the frequency channels;
a first signal generation unit configured, while the frequency channels are sequentially switched, to (i) generate a notification signal including a number of the one or more communication terminals performing wireless communication via the each of the frequency channels, and (ii) cause the communication unit to transmit the notification signal to a new communication terminal to newly start communication; and
a second signal generation unit configured, while the frequency channels are sequentially switched, to (i) generate a request signal for requesting the one or more communication terminals to transmit acknowledgement signals to the new communication terminal, and (ii) cause the communication unit to transmit the request signal to the one or more communication terminals.

8. The control device according to claim 7 further comprising
a channel control unit configured to cause the second signal generation unit to generate the request signal for each of the frequency channels based on an order signal, the order signal being for ordering the new communication terminal to transmit the request signal to the one or more communication terminals.

9. The control device according to claim 8,
wherein the channel control unit is configured to (i) cause the communication unit to receive, for each of the frequency channels, the order signal including the number of the one or more communication terminals found by the new communication terminal, and (ii) cause the second signal generation unit to generate the request signal sequentially for the frequency channels in order of decreasing a difference between the number held in the management units and the number included in the order signal.

10. The control device according to claim 8,
wherein the channel control unit is configured to (i) cause the communication unit to receive the order signal including information for identifying the one or more communication terminals found by the new communication terminal, and (ii) cause the second signal generation unit to generate the request signal to be transmitted to only a communication terminal not found by the new communication terminal.

11. The control device according to claim 7,
wherein the control device (i) gathers, for each predetermined time period, statistics on a traffic amount of each of the one or more communication terminals managed by the management unit, and (ii) causes the control unit to select, from the frequency channels, a frequency channel having a least traffic amount of a communication terminal from which the new communication terminal fails to receive an acknowledgement signal.

12. A communication method using a communication terminal of wirelessly communicating via a plurality of frequency channels, the communication method comprising:
detecting, for each of the frequency channels, a number of one or more other communication terminals performing wireless communication via the each of the frequency channels, by receiving a notification signal indicating the number from a control device, which is an external device with respect to the communication terminal, while the frequency channels are sequentially switched;
counting, for the each of the frequency channels, a number of one or more other communication terminals performing wireless communication via the each of the frequency channels, by receiving acknowledgement signals transmitted from the one or more other communication terminals while the frequency channels are sequentially switched; and
(i) selecting, from the frequency channels, a frequency channel having a least difference between the number detected in the detecting and the number counted in the counting, and (ii) exchanging the signals with the control device via the selected frequency channel.

13. A control method of controlling a control device that wirelessly communicates with a communication terminal, the control device being an external device with respect to the communication terminal, the control method comprising:

holding, for each of a plurality of the frequency channels, information of one or more communication terminals performing wireless communication via the each of the frequency channels;

transmitting, to a new communication terminal to newly start communication, a notification signal including a number of the one or more communication terminals performing wireless communication via the each of the frequency channels, while the frequency channels are sequentially switched; and transmitting, the one or more communication terminals, a request signal for requesting the one or more communication terminals to transmit acknowledgement signals to the new communication terminal, while the frequency channels are sequentially switched.

14. A non-transitory computer-readable recording medium for use in a computer to perform wireless communication, said recording medium having a computer program recorded thereon for causing the computer to execute:

detecting, for each of the frequency channels, a number of one or more other communication terminals performing wireless communication via the each of the frequency channels, by receiving a notification signal indicating the number from a control device, which is an external device with respect to the computer, while the frequency channels are sequentially switched;

counting, for the each of the frequency channels, a number of one or more other communication terminals performing wireless communication via the each of the frequency channels, by receiving acknowledgement signals transmitted from the one or more other communication terminals while the frequency channels are sequentially switched; and (i) selecting, from the frequency channels, a frequency channel having a least difference between the number detected in the detecting and the number counted in the counting, and (ii) exchanging the signals with the control device via the selected frequency channel.

15. An integrated circuit used in a communication terminal performing wireless communication, the integrated circuit comprising:

a communication unit configured to exchange signals via a frequency channel selected from a plurality of frequency channels;

a first detection unit configured to detect, for each of the frequency channels, a number of one or more other communication terminals performing wireless communication via the each of the frequency channels, by causing the communication unit to receive a notification signal indicating the number from a control device, which is an external device with respect to the communication terminal, while the frequency channels are sequentially switched;

a second detection unit configured to count, for the each of the frequency channels, a number of one or more other communication terminals performing wireless communication via the each of the frequency channels, by causing the communication unit to receive acknowledgement signals transmitted from the one or more other communication terminals while the frequency channels are sequentially switched; and a channel control unit configured to (i) select, from the frequency channels, a frequency channel having a least difference between the number detected by the first detection unit and the number counted by the second detection unit, and (ii) cause the communication unit to exchange the signals with the control device via the selected frequency channel.

* * * * *